US011239931B2

(12) United States Patent
Ozturk et al.

(10) Patent No.: US 11,239,931 B2
(45) Date of Patent: Feb. 1, 2022

(54) GENERALIZED FREQUENCY DIVISION MULTIPLEXING METHOD WITH MULTIPLE-INPUT MULTIPLE-OUTPUT AND FLEXIBLE INDEX MODULATION

(71) Applicants: ISTANBUL TEKNIK UNIVERSITESI, Istanbul (TR); NETAS TELEKOMUNIKASYON A.S., Istanbul (TR)

(72) Inventors: Ersin Ozturk, Istanbul (TR); Ertugrul Basar, Istanbul (TR); Hakan Ali Cirpan, Istanbul (TR)

(73) Assignees: ISTANBUL TEKNIK UNIVERSITESI, Istanbul (TR); NETAS TELEKOMUNIKASYON A.S., Istanbul (TR)

( * ) Notice: Subject to any disclaimer, the term of this patent is extended or adjusted under 35 U.S.C. 154(b) by 242 days.

(21) Appl. No.: 16/626,549

(22) PCT Filed: Jul. 3, 2018

(86) PCT No.: PCT/TR2018/050341
§ 371 (c)(1),
(2) Date: Dec. 25, 2019

(87) PCT Pub. No.: WO2020/009668
PCT Pub. Date: Jan. 9, 2020

(65) Prior Publication Data
US 2021/0359777 A1    Nov. 18, 2021

(51) Int. Cl.
*H04J 1/08*    (2006.01)
*H04B 7/0413*    (2017.01)
(Continued)

(52) U.S. Cl.
CPC .......... *H04J 1/085* (2013.01); *H04B 7/0413* (2013.01); *H04J 11/004* (2013.01);
(Continued)

(58) Field of Classification Search
CPC ....... H04B 7/0413; H04J 11/004; H04J 1/085; H04L 4/0046; H04L 27/2607
See application file for complete search history.

(56) References Cited

U.S. PATENT DOCUMENTS 6,549,585 B2    4/2003    Naguib et al.
7,068,628 B2    6/2006    Li et al.
(Continued)

FOREIGN PATENT DOCUMENTS

CN    104601312 B    5/2015
CN    108234102 A    6/2018
(Continued)

OTHER PUBLICATIONS

John A.C. Bingham, "Multicarrier Modulation for Data Transmission: An Idea Whose Time Has Come", IEEE Commun. Mag.,1990, pp. 5-14, vol. 28, No. 5.
(Continued)

*Primary Examiner* — Curtis B Odom
(74) *Attorney, Agent, or Firm* — Bayramoglu Law Offices LLC

(57) ABSTRACT

A generalized frequency division multiplexing method with multiple-input multiple-output and flexible index modulation, which enables to have the energy efficiency provided by space and frequency index modulation systems with generalized frequency division multiplexing (GFDM) without complicating the transmitter and receiver structure and provide for the efficient use of frequency resources, increase in spectral efficiency, minimum complexity and increase in energy efficiency.

3 Claims, 12 Drawing Sheets

(51) Int. Cl.
H04J 11/00 (2006.01)
H04L 5/00 (2006.01)
H04L 27/26 (2006.01)
(52) U.S. Cl.
CPC ........ *H04L 5/0046* (2013.01); *H04L 27/2607* (2013.01); *H04L 5/0007* (2013.01); *H04L 5/0023* (2013.01)

(56) References Cited

U.S. PATENT DOCUMENTS

| 8,908,796 | B1* | 12/2014 | Guvenkaya | H04L 27/2647 375/296 |
|---|---|---|---|---|
| 9,049,676 | B2 | 6/2015 | Haas et al. | |
| 2010/0189132 | A1 | 7/2010 | Fettweis et al. | |
| 2016/0294521 | A1 | 10/2016 | Au et al. | |

FOREIGN PATENT DOCUMENTS

| EP | 2200244 A1 | 6/2010 |
|---|---|---|
| EP | 2540123 A2 | 1/2013 |
| WO | 2013144715 A1 | 10/2013 |
| WO | 2017072529 A1 | 5/2017 |
| WO | 2017197270 A1 | 11/2017 |

OTHER PUBLICATIONS

J. Abdoli, M. Jia, J. Ma, "Filtered OFDM: A new waveform for future wireless systems," in Proc. IEEE Int. Workshop Signal Process. Adv. Wireless Commun., Jun. 2015, pp. 66-70, Stockholm, Sweden.
X. Zhang, M. Jia, L. Chen, J. Ma, and J. Qiu, "Filtered-OFDM-Enabler for flexible waveform in the 5th generation cellular networks," in Proc. IEEE GLOBECOM Workshops, Dec. 2015, pp. 1-6, San Diego CA.
E. Bala, J. Li, and R. Yang, "Shaping spectral leakage: A novel low-complexity transceiver architecture for cognitive radio," IEEE Veh. Technol. Mag., Sep. 2013, s. 38-46, vol. 8, No. 3.
N. Michailow, M. Matthe, I. S. Gaspar, An N. Caldevilla, L. L. Mendes, A. Festag, G. Fettweis, "Generalized frequency division multiplexing for 5th generation cellular networks," IEEE Trans. Commun., Sep. 2014, pp. 3045-3061, vol. 62, No. 9.
I. E. Telatar, "Capacity of Multi-Antenna Gaussian Channels", European Trans. on Telecommun., 1999, pp. 558-595, vol. 10, No. 6.
W. Zhang, X-G Xia, K. B. Letaief, "Space-Time/Frequency Coding for MIMO-OFDM in Next Generation Broadband Wireless Systems", IEEE Wireless Communications, 2007, vol. 15, No. 3.
S. Alamouti, "A Simple Transmit Diversity Technique for Wireless Communications," IEEE J. Sel. Areas Commun., Oct. 1998, pp. 1451-1458, vol. 16, No. 8, pp.
V. Tarokh, N. Seshadri, and A. Calderbank, "Space-time codes for high data rate wireless communication: Performance criterion and code construction," IEEE Trans. Inf. Theory, Mar. 1998, pp. 744-765, vol. 44, No. 2.
G. J. Foschini, "Layered space-time architecture for wireless communication in a fading environment when using multi-element antennas," Bell Labs Tech. J., Sep. 1996, pp. 41-59, vol. 1, No. 2.
P. Wolniansky, G. Foschini, G. Golden, and R. Valenzuela, "VBLAST: An architecture for realizing very high data rates over the rich scattering wireless channel," in Proc. URSI ISSSE, Sep. 1998, pp. 295-300.
M. Matthe, L. L. Mendes, and G. Fettweis, "Space-time coding for generalized frequency division multiplexing," in Proc. 20th Eur. Wireless Conf., May 2014, pp. 1-5, Barcelona, Spain.
M. Matthe, L. L. Mendes, I. Gaspar, N. Michailow, D. Zhang, and G. Fettweis, "Widely linear estimation for space-time-coded GFDM in low-latency applications," IEEE Trans. Commun., Nov. 2015, pp. 4501-4509, vol. 63, No. 11.

M. Matthe, L. L. Mendes, I. Gaspar, N. Michailow, D. Zhang, and G. Fettweis, "Multi-user time-reversal STC-GFDMA for future wireless networks," EURASIP J. Wireless Commun. Netw., May 2015, pp. 1-8, vol. 2015, No. 1.
D. Zhang, L. L. Mendes, M. Matthe, N. Michailow, and G. Fettweis, "Expectation propagation for near-optimum detection of MIMO-GFDM signals," IEEE Trans. Wireless Commun., Feb. 2016, pp. 1045-1062, vol. 15, No. 2.
D. Zhang, L. L. Mendes, M. Matthe, and G. Fettweis, "A Markov chain Monte Carlo algorithm for near-optimum detection of MIMO-GFDM signals," in Proc. IEEE Pers., Indoor Mobile Radio Commun. (PIMRC), Aug. 2015, pp. 1-5.
N. Tunali, M. Wu, C. Dick, C. Studer, and S. Jose, "Linear large-scale MIMO data detection for 5G multi-carrier waveform candidates," in Proc. Asilomar Conf. Signals, Syst., Comput., Nov. 2015, pp. 1-5.
M. Matthe, I. Gaspar, D. Zhang, and G. Fettweis, "Near-ML detection for MIMO-GFDM," in Proc. 82nd IEEE Veh. Technol. Conf. Fall, Sep. 2015, pp. 1-2, Boston, MA, ABD.
M. Matthe, D. Zhang, and G. Fettweis, "Iterative detection using MMSE-PIC demapping for MIMO-GFDM systems," in Proc. IEEE Eur. Wireless (EW), May 2016, pp. 1-7.
M. Matthe, D. Zhang, and G. Fettweis, "Sphere-decoding aided SIC for MIMO-GFDM: Coded performance analysis," in Proc. Int. Symp.WirelessCommun. Syst. (ISWCS), Sep. 2016, pp. 165-169, Poznan, Poland.
D. Zhang, M. Matthe, L. L. Mendes, and G. Fettweis, "A study on the link level performance of advanced multicarrier waveforms under MIMO wireless communication channels," IEEE Trans. Wireless Commun., Apr. 2017, pp. 2350-2365, vol. 16, No. 4.
R. Y. Mesleh, H. Haas, S. Sinanovic, C. W. Ahn, and S. Yun, "Spatial modulation," IEEE Trans. Veh. Technol., Jul. 2008, pp. 2228-2241, vol. 57, No. 4.
J. Jeganathan, A. Ghrayeb, L. Szczecinski, and A. Ceron, "Space shift keying modulation for MIMO channels," IEEE Trans. Wireless Commun., 2009, pp. 3692-3703, vol. 8, No. 7.
S. Sugiura, S. Chen, and L. Hanzo, "Coherent and differential space time shift keying: A dispersion matrix approach," IEEE Trans. Commun., Nov. 2010, pp. 3219-3230, vol. 58, No. 11.
R. Mesleh, S. Ikki, H. Aggoune, "Quadrature spatial modulation," IEEE Trans. Veh. Technol., Jun. 2015, pp. 2738-2742 vol. 64, No. 6.
E. Basar, U. Aygolu, E. Panayirci, and H. V. Poor, "Orthogonal frequency division multiplexing with index modulation," IEEE Trans. Signal Process., Nov. 2013, pp. 5536-5549 vol. 61, No. 22.
R. Abu-Alhiga and H. Haas, "Subcarrier-index modulation OFDM," in Proc. IEEE Int. Symp. Pers., Indoor Mobile Radio Commun., Sep. 2009, pp. 177-181, Tokyo, Japan.
D. Tsonev, S. Sinanovic, and H. Haas, "Enhanced subcarrier index modulation (SIM) OFDM," in Proc. IEEE GLOBECOM Workshops, Dec. 2011, pp. 728-732.
T. Mao, Z. Wang, Q. Wang, S. Chen, and L. Hanzo, "Dual-mode index modulation aided OFDM," IEEE Access, 2016, pp. 50-60, vol. 5.
M. Wen, E. Basar, Q. Li, B. Zheng, and M. Zhang, "Multiple-mode orthogonal frequency division multiplexing with index modulation," IEEE Trans. Commun., Sep. 2017, pp. 3892-3906, vol. 65, No. 9.
E. Basar, "OFDM with index modulation using coordinate interleaving," IEEE Wireless Commun. Lett., Aug. 2015, pp. 381-384, vol. 4, No. 4.
R. Fan, Y. J. Yu, and Y. L. Guan, "Generalization of orthogonal frequency division multiplexing with index modulation," IEEE Trans. Wireless Commun., Oct. 2015, pp. 5350-5359, vol. 14, No. 10.
M. Wen, Y. Zhang, J. Li, E. Basar, and F. Chen, "Equiprobable subcarrier activation method for OFDM with index modulation," IEEE Commun. Lett., Dec. 2016, pp. 2386-2389, vol. 20, No. 12.
M.Wen, B. Ye, E. Basar, Q. Li, and F. Ji, "Enhanced orthogonal frequency division multiplexing with index modulation," IEEE Trans. Wireless Commun., Jul. 2017, pp. 4786-4801, vol. 16, No. 7.
H. Zhang, L. L. Yang, and L. Hanzo, "Compressed sensing improves the performance of subcarrier index-modulation-assisted OFDM," IEEE Access, Oct. 2016, pp. 7859-7873, vol. 4.

(56) References Cited

OTHER PUBLICATIONS

E. Basar, "Multiple-input multiple-output OFDM with index modulation," IEEE Signal Process. Lett., 2015, pp. 2259-2263, vol. 22, No. 12.

T. Datta, H. S. Eshwaraiah, and A. Chockalingam, "Generalized space and frequency index modulation," IEEE Trans. Veh. Technol., Jul. 2016, pp. 4911-4924, vol. 65, No. 7.

E. Basar, "On multiple-input multiple-output OFDM with index modulation for next generation wireless networks," IEEE Trans. Signal Process., Aug. 2016, pp. 3868-3878, vol. 64, No. 15.

B. Zheng, M.Wen, E. Basar, and F. Chen, "Multiple-input multiple-output OFDM with index modulation: Low-complexity detector design," IEEE Trans. Signal Process., Jun. 2017, pp. 2758-2772, vol. 65, No. 11.

E. Ozturk, E. Basar, and H. A. Cirpan, "Spatial modulation GFDM: A low complexity MIMO-GFDM system for 5G wireless networks," in Proc. 4th IEEE Int. Black Sea Conf. Commun. Netw., Jun. 2016, pp. 1-5, Varna, Bulgaria.

E. Ozturk, E. Basar, and H. A. Cirpan, "Generalized frequency division multiplexing with index modulation," in Proc. IEEE GLOBECOM Work-shops, Dec. 2016, pp. 1-6, Washington DC, ABD.

E. Ozturk, E. Basar, and H. A. Cirpan, "Generalized frequency division multiplexing with space and frequency index modulations," in Proc. 5th IEEE Int. Black Sea Conf. Commun. Netw., Jun. 2017, pp. 1-6, Istanbul, Turkey.

E. Ozturk, E. Basar, and H. A. Cirpan, "Generalized Frequency Division Multiplexing with Flexible Index Modulation," IEEE Access, 2017, pp. 4-7, figures 1-3, vol. 5.

Chang, Yu-Kuan, Ueng, Fang-Biau, "A novel turbo GFDM-IM receiver for MIMO communications", International Journal of Electronics and Communications, 2018, pp. 22-32, figures 1-3; NL vol. 87 Elsevier, Amsterdam.

\* cited by examiner

GENERALIZED FREQUENCY DIVISION MULTIPLEXING METHOD WITH MULTIPLE-INPUT MULTIPLE-OUTPUT AND FLEXIBLE INDEX MODULATION

CROSS REFERENCE TO THE RELATED APPLICATIONS

This application is the national phase entry of International Application No. PCT/TR2018/050341, filed on Jul. 3, 2018, the entire contents of which are incorporated herein by reference.

TECHNICAL FIELD

The invention is related to a generalized frequency division multiplexing method with multiple-input multiple-output and flexible index modulation, which enables to have the energy efficiency provided by space and frequency index modulation systems that have generalized frequency division multiplexing (GFDM) without complicating the transmitter and receiver structure.

BACKGROUND

Today, wireless telecommunication has become an indispensable tool for daily life. In the last 30-year period, a high increase has been observed in the number of users and applications in wireless telecommunication. Going by this increase, the high frequency and energy efficiency of today's telecommunication applications and the demands for minimum latency and maximum data rate, can be seen that the wireless telecommunication infrastructures will need improved methods in the upcoming period.

Multicarrier telecommunication techniques have stood out because of the technical difficulties related to time domain equalization at the receiver, especially at higher data rates with the single carrier telecommunication techniques. The most commonly used type of multicarrier telecommunication today is the orthogonal frequency division multiplexing (OFDM) technique, which takes place in many radio communication standards.

In an OFDM system, the high-speed data array is decomposed and the requirement for complicated equalizers is eliminated by transmitting them over a great number of orthogonal subcarriers. In order to prevent inter-symbol interference, a space is left in time before the symbol. This space is filled with the last part of the symbol in order to make the equalizer's job easier at the receiver, by transforming the linear convolutional effect to the circular convolutional effect. The waveform formed in this manner is called cyclicly prefixed orthogonal frequency division multiplexing (CP-OFDM). Recently, in order to reduce out of band emission of CP-OFDM, the studies, based on filtering the transmission band, such as filtered orthogonal frequency division multiplexing (filtered-OFDM, f-OFDM) and windowed orthogonal frequency division multiplexing (windowed-OFDM, W-OFDM), and filtering each of the subcarrier systems of the multi carrier system individually have been carried out.

Generalized frequency division multiplexing (Generalized Frequency Division Multiplexing, GFDM) is a physical layer technique proposed in order to eliminate the disadvantages of OFDM such as high out of band emission, frequency efficiency loss due to cyclic prefix usage for each time interval.

In GFDM, on each subcarrier, more than one timeslot takes place on the contrary to the OFDM and the out of band emission is reduced by filtering each subcarrier individually. Filtering the subcarriers eliminates the orthogonality between the frequency channels and inter channel interference is occurred. GFDM differs from CP-OFDM significantly by this characteristic. In GFDM, spectral efficiency is increased using a single cyclic prefix for more than one timeslot. In GFDM, customization can be realized according to the needs of telecommunication applications for the use of time and frequency resources by making adjustments between the number of subcarriers and timeslots.

Multiple-input multiple-output (multiple-input multiple-output, MIMO) transmission techniques provide significant improvements with regards to channel capacity and error performance compared to single-input single-output (SISO) systems.

For this reason, MIMO systems have taken their place in many radio communication standards such as IEEE 802.11n (Wi-Fi), 3GPP Long Term Evolution (LTE-4G), IEEE 802.16 WiMAX.

By means of the advantages provided by MIMO techniques, their use is inevitable for future wireless telecommunication applications. Thus, studies have been realized regarding the integration of GFDM and MIMO methods. Space-time coding (STC) and spatial multiplexing are the two prominent MIMO methods. In the STC method, the spatial diversity is maximized and power efficiency is improved.

In spatial multiplexing, the capacity is increased by transmitting independent data streams from different transmitter antennas. Diagonal BLAST (D-BLAST) and vertical BLAST (V-BLAST) are the most frequently used spatial multiplexing applications.

In literature, studies in which GFDM is integrated with space-time coding methods and studies in which it is integrated with the spatial multiplexing method are present.

In reference documents "Expectation propagation for near-optimum detection of MIMO-GFDM signals" and "A Markov chain Monte Carlo algorithm for near-optimum detection of MIMO-GFDM signals", iterative MIMO decoders are used. In reference documents "Linear large-scale MIMO data detection for 5G multi-carrier waveform candidates", at the receiver, a method in which the minimum mean squared error (MMSE) detector and zero-forced (ZF) GFDM demodulators are used separately is proposed. In reference documents "Near-ML detection for MIMO-GFDM", the equivalent MIMO-GFDM channel which combines the GFDM modulation and MIMO channel under one expression is set forth and the sphere decoder (SD) algorithm is used with successive interference cancellation (SIC) in order to detect the subcarrier groups. Based on the equivalent MIMO-GFDM model proposed in reference documents "Near-ML detection for MIMO-GFDM", in reference documents "Iterative detection using MMSE-PIC demapping for MIMO-GFDM systems", the parallel interference canceller MMSE detector is proposed and in reference documents "Sphere-decoding aided SIC for MIMO-GFDM: Coded performance analysis", the coded performance analysis of the MIMO-GFDM system is realized. In reference documents "A study on the link level performance of advanced multicarrier waveforms under MIMO wireless communication channels", the minimum complexity application of the MMSE detector is proposed.

Spatial modulation (SM) is a MIMO method which is based on transmitting additional information bits using the transmission antenna as a spatial symbol.

In spatial modulation, in each transmission time interval, only one transmit antenna is activated according to input bits, in the meantime, no transmission takes place from the other transmit antennas. In the multicarrier applications of spatial modulation, only one transmit antenna is activated for each subcarrier. Activating only one transmit antenna for each time interval or subcarrier prevents inter antenna interference (IAI) and thus, receiver complexity is reduced. Due to these reasons, the spatial modulation system has been an interest and derivative applications have been formed.

Space-shift keying (SSK), space-time shift keying (STSK) and quadrature spatial modulation (quadrature SM, QSM) are among these derivative applications.

In the SSK method, phase shift keying (PSK) or quadrature amplitude modulation (QAM) symbols are not used, the antennas transmit a constant signal with no data. Therefore, data is conveyed only by the active transmitter antenna indexes. In the STSK method, the data communication is realized by using both the indexes of predetermined dispersion matrixes and the signal constellation points and the spatial modulation is broadened by using both space and time dimensions. The QSM method broadens the spatial signal constellation as the in-phase and quadrature phase and doubles the number of spatially carried bits with respect to a conventional SM system. In the QSM method, the signal constellation symbols are divided to in-phase and quadrature phase parts and the transmitter antennas these parts will be transmitted to are determined separately based on the input bits.

OFDM with index modulation (OFDM-IM) has been obtained as a result of applying the spatial modulation concept to subcarrier indexes in multicarrier systems.

In the OFDM-IM method, all subcarriers are not activated, the active subcarriers are determined according to input bits and thus, data is carried both by the active subcarrier indexes and the conventional modulation symbols. OFDM-IM is a promising new approach proposed as an alternative to the classical OFDM and it presents interesting trade-offs between error performance and spectral efficiency compared to the classical OFDM. While the error performance improves thanks to the additional bits carried by the active subcarrier indexes in the OFDM-IM, the transmission capacity is reduced due to the unused subcarriers. In the dual-mode OFDM-IM (DM-OFDM) proposed in reference documents "Dual-mode index modulation aided OFDM", data communication is possible with active subcarrier indexes without the transmission capacity being reduced. In order to accomplish that, two separate signal constellations which do not intersect each other are used in the DM-OFDM method. While the subcarrier indexes chosen according to input bits carry the symbols of a signal constellation, the remaining subcarriers use the symbols of the other signal constellation.

Recently, many studies have been realized in order to improve the frequency efficiency, diversity and coding gains of OFDM-IM.

In addition, in reference documents "Multiple-input multiple-output OFDM with index modulation", "Generalized space and frequency index modulation", "On multiple-input multiple-output OFDM with index modulation for next generation wireless networks", and "Multiple-input multiple-output OFDM with index modulation: Low-complexity detector design", the integration of the OFDM-IM with the spatial multiplexing method has been analyzed and it was reported that it provided significant gain.

Due to the advantages the spatial modulation and index modulation provides, studies in which these two schemes are integrated with GFDM have been realized. In reference documents "Spatial modulation GFDM: A low complexity MIMO-GFDM system for 5G wireless networks", spatial modulation and GFDM have been integrated with a suboptimal approach. In this study, ZF algorithm is used for MIMO signal detection and the MIMO signal detection, the GFDM demodulation and spatial demodulation have been realized in three separate stages. Therefore, the receiver structure in reference documents "Spatial modulation GFDM: A low complexity MIMO-GFDM system for 5G wireless networks", has been named as ZF-SDD (ZF-separate detection and demodulation).

In reference documents "Generalized frequency division multiplexing with index modulation", GFDM with index modulation (GFDM-IM) application has been analyzed. In reference documents "Generalized frequency division multiplexing with space and frequency index modulations", GFDM with space-frequency index modulation (GFDM-SFIM) application has been studied by bringing together the spatial modulation, the subcarrier index modulation and GFDM. In this study, MIMO signal detection and GFDM demodulation have been realized with MMSE algorithm in a single stage and the space-frequency index demodulation have been realized as a separate stage. For this reason, the receiver structure in this study was named as MMSE-JDD (MMSE-joint detection and demodulation).

In the U.S. Pat. No. 6,549,585 of the known state of the art, it is mentioned that the blocked coded transmissions of the multiple antenna terminal unit have many antennas on the base station and the co-channel prevention transmission from the other multiple antenna terminal units are detected in an effective manner. While the signals received from a primary station antenna decode the signals transmitted from another terminal unit, it is used for processing the signals received from a secondary station antenna in the way to cancel the signals from a terminal unit. Zero forcing and MMSE approaches have been presented.

In the U.S. Pat. No. 7,068,628 in the known state of the art, a MIMO-OFDM system comprising a large number of space-time coders in order to code the data blocks related to the independent space time codes. The transformed data block signals are transmitted by a large number of transmitter antennas and received by several receiver antennas. The received data have been pre-whitened prior to maximum likelihood detection. In an embodiment, successive interference cancellation can be used in order to increase system performance.

In the Chinese patent document number CN104601312B in the known state of the art, a multipath channel equivalent generating method of a large-scale MIMO (Multiple Input Multiple Output) simulation system is mentioned. The method can be generated by the superimposition of most of the distinguishable delay paths or the superposition of more than one path which are distinguishable and which cannot be delayed. While the channel is being generated, the features of time, space, frequency and the channels on the other dimensions are summarized to the expansion of the related dimensions, the channel is expanded or the related fading dimension is updated at an appropriate time, several paths are combined and then, a space channel matrix can be generated at each OFDM (Orthogonal frequency division multiplexing) frequency.

Although the OFDM technique is a technique which is used in many wireless telecommunication systems such as the wireless local networks, digital TV broadcasts from satellite and cellular telecommunication systems today, they fall behind in some matters especially for new generation applications. At the start of the matters OFDM falls behind is out-of-band emission. Due to the rectangular pulse structure the OFDM uses in the time domain, the out-of-band emission is considerably high. This causes leaving spaces between bands and inefficient use of the frequency spectrum. In addition, using cyclic prefix for each time interval reduces spectral efficiency more.

As a result of the mentioned insufficiencies of OFDM especially for new generation wireless communication networks, a strong paradigm shift is present for working with non-orthogonal frequency channel techniques such as GFDM and the like. Using non-orthogonal frequency channel techniques such as GFDM, an inter channel interference (ICI) is generated. Spatial multiplexing stands out especially in the applications which require maximum data rate because of the capacity increase it provides. Interference is generated between transmitter antennas in spatial multiplexing. In the case that spatial multiplexing technique is desired to be used with GFDM, inter antenna interference is added to the inter channel interference. When the inter symbol interference (IR) that could occur because of the multipath propagation is added to that, the receiver is obliged to struggle with a three-dimensional interference. For this reason, the receiver structure becomes rather complicated.

Thanks to the spatial modulation, the interference between antennas is possible to avoid. For this reason, studies have been carried out, to integrate spatial modulation and GFDM. However, since MIMO detection, GFDM demodulation and spatial symbol demodulation are realized as separate stages in these studies, the desired reduction could not have been accomplished with the signal to noise ratio necessary in order to reach the target bit error rates. In this study in which the receiver structure is named as ZF-SDD, as a result of using the minimum complexity linear filtering method such as ZF detector for the MIMO signal detection, the diversity effect of the MIMO channels has been eliminated. In other words, the communication characteristics of the present MIMO channels could not be used in the strict sense.

In "Generalized frequency division multiplexing with index modulation", GFDM with index modulation study takes place. Due to the subcarriers that have not been used in this study, the spectral efficiency has dropped. Another study in which the spatial modulation and subcarrier index modulation is integrated with GFDM is in "Generalized frequency division multiplexing with space and frequency index modulations". In this study in which the receiver structure is named as MMSE-JDD, MIMO signal detection and GFDM demodulation is applied together and the antenna and index demodulation are realized as two separate stages. For this reason, the desired complexity reduction could not be accomplished with the signal to noise ratio necessary in order to reach the target bit error rated in this study. In addition, since the MMSE method is used for MIMO signal detection and GFDM demodulation, the receiver complexity is too high. In consequence, the studies have been carried out for integrating the GFDM and index modulation applications are far from optimizing the spectral efficiency, error performance and complexity at the same time.

The present applications include using the spatial modulation and subcarrier index modulation separately or in an integrated manner with a constant structure. Among these systems, no application has been encountered in which a transition can be realized according to the channel conditions and use cases.

Whereas these modulations and their integrated forms offer distinct trade-offs in terms of the power necessary in order to achieve spectral efficiency, complexity and the target bit error performance. Applications for the next generation mobile telecommunication systems have been classified into three categories as the enhanced mobile broadband (eMBB), massive machine type telecommunication (mMTC) and ultra-reliable low latency telecommunication (URLLC). It is inevitable for these applications which have different requirements to evaluate the trade-offs the index modulation systems will offer in a distinct manner. Dealing with the spatial modulation and subcarrier index modulation in a constant structure separately or in an integrated manner will require the use of a separate device for each application category. For this reason, these solutions do not have the flexibility and dynamic operating structure the 5G network applications will need and they will cause difficulties in terms of the cost and size restrictions for users who want to use more than one category of applications with the same device. In addition, it will bear the result that the same structure is kept even if the channel conditions change.

Among mobile application data, information having different significance level can take place. While a lot of bit errors are tolerated in some applications, in other applications, a 1-bit error can cause the whole package to become dysfunctional. In order to avoid these cases, a method is rendering the channel coding stronger. However, in this case, the spectral efficiency and power efficiency of the system will drop. In order to avoid these problems, there is a need for embedded methods which provide for higher error performance without bringing additional redundancy and which use the same spatial, time and frequency resources. Therefore, the need to improve the subject method has arisen.

SUMMARY

The purpose of this invention is to realize the multiple-input multiple-output and generalized frequency division multiplexing method with flexible index modulation which provide for higher error performance without bringing additional redundancy and which use the same spatial, time and frequency resources.

Another purpose of this invention is to realize the multiple-input multiple-output and generalized frequency division multiplexing method with flexible index modulation which can have the energy efficiency provided by the space and frequency index modulation systems without complicating the transmitter and receiver structure.

Another purpose of this invention is to realize the multiple-input multiple-output and generalized frequency division multiplexing method with flexible index modulation which provide for the efficient use of frequency resources, increase in spectral efficiency, minimum complexity and increase in energy efficiency.

Another purpose of this invention is to realize the multiple-input multiple-output and generalized frequency division multiplexing method with flexible index modulation which has an adaptive modulation structure and which enables multi-layered communication.

BRIEF DESCRIPTION OF THE DRAWINGS

The elements which take place in the multiple-input multiple-output generalized frequency division multiplexing method with flexible index modulation realized in order to achieve the purposes of this invention have been shown in the attached figures.

These figures are.

Figure 1:
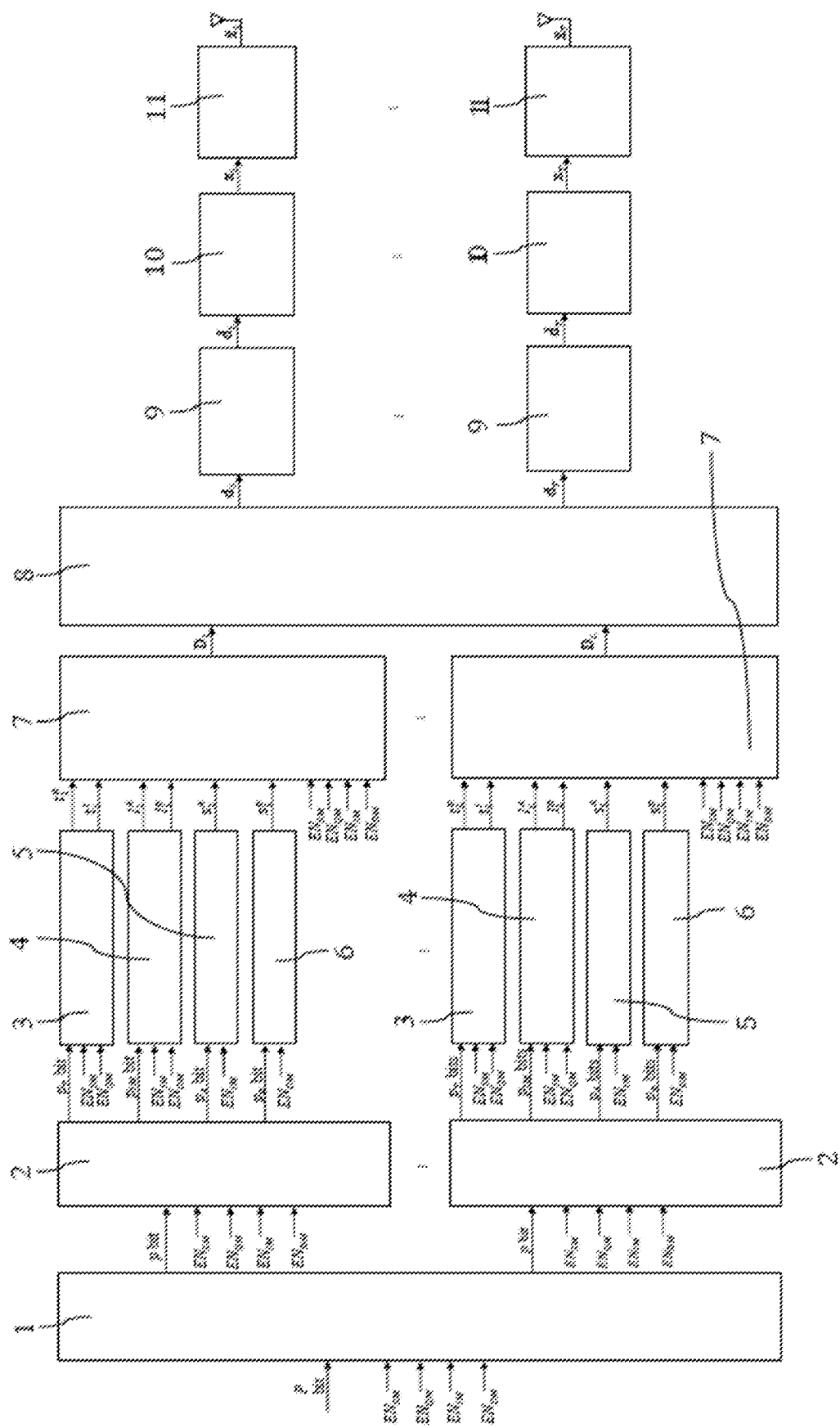
FIG. 1 shows a diagrammatic view of the transmitter structure used in the method of the subject invention.

The elements in the figures have been numbered one by one and their references are given below.

1. Primary bit splitter
2. Secondary bit splitter
3. Tx Antenna selector
4. Index selector
5. Mapper A
6. Mapper B
7. FIM block generator
8. GFDM block generator
9. Block inter leaver
10. GFDM modulator
11. Cyclic prefix addition
12. Cyclic prefix removal
13. MIMO detection GFDM and space-frequency demodulation
14. Tx Antenna demapper
15. Index demapper
16. Q-ary Demapper A
17. Q-ary Demapper B
18. Secondary bit combiner
19. Primary bit combiner
20. QR decomposer
21. UFIM block ML detector
22. UFIM block re-creater
23. UFIM block dispatcher

DETAILED DESCRIPTION OF THE EMBODIMENTS

The invention brings the space and frequency index modulation techniques together in an efficient way and combines these techniques with generalized frequency division multiplexing (GFDM) in the most eligible way.

The subject method comprises the steps of;

Taking a generalized frequency division multiplexing (MIMO-GFDM) system with multiple-input multiple-output composed of T number of transmitter antennas and R numbers of receiver antennas, Then separating the P number of data bits to L groups of p-bit each with the primary bit splitter (1), Mapping p-bit in each group to a subcarrier group with u elements, Taking the $p_T = EN_{SM}(1+EN_{QM})\log_2(T)$ bit part of p-bit data in the Tx Antenna selector (3) block, Defining these bits as a number in the binary number order, Determining the transmission antenna for the subcarrier group with u-elements at the transmitter antenna numbered by a decimal number corresponding to this binary number, The subcarrier index selector (4) block taking $p_{IM}$ bits and choosing these bits as the subcarrier indexes indicated by $I_l^A = \{i_{l,1}^A, i_{l,2}^A, \ldots i_{l,v}^A\}$ which will take place in the primary subcarrier group according to a selection rule.

Then choosing the remaining bits of p-bit data and the QAM symbols to be assigned to the subcarriers, Generating the GFDM symbol by bringing L groups with u-elements together, Then, making the $N_{CP}$-length cyclic prefix addition (11) in order to convert the linear convolution effect of the channel to cyclic convolution, Performing cyclic prefix removal (12) at the receiver, Operating the near optimum decision rule with the ML-SIC technique in order to determine the data transmitted at the receiver with maximum likelihood, Then, obtaining p-bit stream for each space-frequency index modulation block at the secondary bit combiner (18), Finally, obtaining the P bit input information bits by combining p-bit of streams with the primary bit combiner (19).

As mentioned before, more than one timeslot is allowed at each subcarrier in GFDM. For this reason, in a GFDM symbol composed of K number of subcarriers, M number of timeslots are the number of timeslots allowed in each subcarrier and the total sample number in a GFDM symbol is N=KM. In other words, a GFDM symbol is composed of M number of sub-symbols. In the proposed method, a MIMO-GFDM system of T number of transmitter and R number of receiver antennas is addressed. The transmitter has four control signals named $EN_{SM}$, $EN_{QM}$, $EN_{IM}$ and $EN_{DM}$. These control signals can take 0 and 1 value and they are used to control the SM, QSM, IM and double mode index modulation (DMIM) operating modes on-off respectively.

All the parameters in the method of the subject invention are shown in Table-1. The operation modes to be applied according to the condition of the control signals can be seen in Table-2. By means of these control signals, all the operation modes seen in Table-2 can be performed with a single transmitter.

The block diagram of the transmitters in the method of the subject invention is seen in FIG. 1. The primary bit splitter (1) takes P number of data bits from the input together with the control signals given in Table-2 and splits this P number of data bits to L groups of p-bit each. p bits in each group will be mapped to a subcarrier group with u-elements by a three-stage process. In this mapping process, the antenna index, the subcarrier index and QAM symbols will be used together. In addition, QAM symbols will be separated into their in-phase and quadrature phase components. In order to provide this mapping, the secondary bit splitter (2) splits p number of bits into four groups as $p_T$, $p_{IM}$, $p_A$ and $p_B$ according to the condition of the control signals.

TABLE 1

System Parameters

| Description | Parameter |
| --- | --- |
| Transmitter antenna number | T |
| Receiver antenna number | R |
| Subcarrier number in the GFDM sub-symbol | K |
| GFDM sub-symbol number | M |
| Total subcarrier number in the GFDM symbol | N |
| SM mode control signal | $EN_{SM}$ |
| QSM mode control signal | $EN_{QM}$ |
| IM mode control signal | $EN_{IM}$ |
| DMIM mode control signal | $EN_{DM}$ |
| Subcarrier number in the subcarrier index group | u |
| Subcarrier number in the subcarrier primary index group | v |
| Subcarrier number in the subcarrier secondary index group | u − v |
| Subcarrier index group number | L |
| Primary signal constellation | $S^A$ |
| Secondary signal constellation | $S^B$ |
| Element number in the primary signal constellation | $Q_A$ |
| Element number in the secondary signal constellation | $Q_B$ |

TABLE 2

Flexible Index Modulation Control Table

| Mode | $EN_{SM}$ | $EN_{QM}$ | $EN_{IM}$ | $EN_{DM}$ |
| --- | --- | --- | --- | --- |
| GFDM | 0 | 0 | 0 | 0 |
| GFDM-IM | 0 | 0 | 1 | 0 |
| GFDM-DMIM | 0 | 0 | 1 | 1 |
| SM-GFDM | 1 | 0 | 0 | 0 |
| QSM-GFDM | 1 | 1 | 0 | 0 |
| SFIM-GFDM | 1 | 0 | 1 | 0 |
| QSFIM-GFDM | 1 | 1 | 1 | 0 |
| SFDMIM-GFDM | 1 | 0 | 1 | 1 |
| QSFDMIM-GFDM | 1 | 1 | 1 | 1 |

The first stage of the mapping procedure is determining the antenna index. In this stage, the transmitter antenna selector (3) block takes the $$p_T = EN_{SM}(1+EN_{QM})\log_2(T) \quad (1)$$

bit part of the p-bit data, accepts these bits as a number in the binary number order and chooses the transmitter antenna (3) numbered by a decimal number corresponding to this binary number as the transmission antenna for the subcarrier group with u-elements. If both SM and QSM modes are active, which means $EN_{SM}=1$, $EN_{QM}=1$, the first $\log_2(T)$ bit part of the $p_T$-bit is used to determine $t_l^R$, which is the antenna which will transmit the in-phase part of the modulated signals and the second $\log_2(T)$ bit part is used to determine $t_l^I$, which is the antenna which will transmit the quadrature phase part of the modulated signals. Here, $t_l^R$, $t_l^I \in \{1, \ldots, T\}$. If the QSM mode is not going to be used, which means if $EN_{QM}=0$, only $t_l^R$ is determined and this antenna is used for the transmission of both in-phase and quadrature phase parts of the modulated signals. When the SM mode is not used, which means $EN_{SM}=0$, the transmitter antenna selector block is disabled and transmission is constantly realized through a pre-determined antenna.

The second stage of the mapping is the subcarrier index selection stage. This stage operates when the IM mode is active, which means $EN_{IM}=1$. In this stage, the subcarrier index selector (4) block takes $p_{IM}$ bits and uses these bits according to a selection rule in order to select the subcarrier indexes which will take place in the primary subcarrier sub-group shown by $$I_l^A = \{i_{l,1}^A, i_{l,2}^A, \ldots, i_{l,v}^A\}. \quad (2)$$

Here, $i_{l,\gamma}^A \in \{1, \ldots u\}$, $\gamma=1, \ldots v$, and $l \in \{1, \ldots L\}$. The subcarriers chosen by $I_l^A$ determine v number of subcarriers. If the DMIM mode is used together with the IM mode, which means $EN_{DM}=1$, the remaining u−v number of subcarriers form the secondary subcarrier sub-group shown by $$I_l^B = \{i_{l,1}^B, i_{l,2}^B, \ldots, i_{l,u-v}^B\}. \quad (3)$$

Here, $i_{l,\gamma}^B \in \{1, \ldots u\}$, $\gamma=1, \ldots u-v$, and $l \in \{1, \ldots L\}$. Since $I_l^A$ can take $c=2^{p_{IM}}$ possible values, only c number of the C (u, v) combinations can be used. Therefore $p_{IM}$ is determined as $$p_{IM} = EN_{IM} \lfloor \log_2(C(u,v)) \rfloor. \quad (4)$$

If the IM mode is not active, the subcarrier index selector (4) block cannot be active, in this case, u=1 and all the subcarriers are used without a selection.

The third stage of mapping is QAM modulation stage. At this stage, in order to modulate the subcarriers chosen by $I_l^A$, mapper A (5) takes $p_A$ number of bits and uses $S^A$ signal constellation with the $Q_A$-elements to modulate v number of subcarriers. Therefore $p_A$ is defined as $$p_A = v \log_2(Q_A). \quad (5)$$

If the DMIM mode is active together with the IM mode, which means $EN_{DM}=1$, mapper B (6) takes $p_B$ number of bits in order to modulate the subcarriers chosen by $I_l^B$ and uses the $S^B$ signal constellation with $Q_B$-elements in order to modulate u−v number of subcarriers. Therefore $p_B$ is defined as $$p_B = EN_{IM} EN_{DM} (u-v) \log_2(Q_B). \quad (6)$$

At this point, in order to detect the subcarrier index sub-groups at the receiver healthily, the intersection of the signal constellations used by the mapper A (5) and mapper B (6) should be empty set, which means, $S^A \cap S^B$ should be ∅.

As a result, the vector of the modulated symbols mapped by mapper A (5) for the index subgroup $I_l^A$, which carries $p_A$ bits, and the vector of the modulated symbols mapped by mapper B (6) for the index subgroup $I_l^B$, which carries $p_B$ bits, can be expressed by:

$$s_l^A = [s_l^A(1), s_l^A(2), \ldots, s_l^A(v)]^T, \quad (7)$$

$$s_l^B = [s_l^B(1), s_l^B(2), \ldots, s_l^B(u-v)]^T. \quad (8)$$

Here, $s_l^A(\gamma) \in S^A$, $\gamma=1, \ldots, v$, $s_l^B(\gamma) \in S^B$, $\gamma=1, \ldots, u-v$. If paid close attention, when the IM mode is not active, which means $EN_{IM}=0$, $u=1$, $v=1$ and $s_l^A$ includes only one QAM signal, $s_l^B$ is null vector. Then, FIM Block generator (7) combines $s_l^A$ and $s_l^B$ and obtains the signal vector for subcarrier group l as in the following:

$$s_l = [s_l(1), s_l(2), \ldots, s_l(u)]^T. \quad (9)$$

Here, $s_l(\gamma) \in \{S^A, S^B, 0\}$ and $\gamma=1, \ldots, u$. In Table 3, an exemplary subcarrier index sub-groups placement for $u=4$, $v=2$ is seen. When the DMIM mode is not active, in subcarrier index sub-groups, $s_l^B(1)$ and $s_l^B(2)$ elements will be 0.

The next step of selecting transmitter antenna is performed according to the condition of the $EN_{QM}$ control signal. When the QSM mode is active, which means $EN_{QM}=1$, the in-phase part of $s_l$ is assigned to the transmitter antenna determined by $t_l^R$, the quadrature phase part is assigned to the antenna determined by $t_l^I$:

$$s_{t_l^R,l} = [s_{t_l^R,l}(1), s_{t_l^R,l}(2), \ldots, s_{t_l^R,l}(u)]^T, \quad (10)$$

$$s_{t_l^I,l} = [s_{t_l^I,l}(1), s_{t_l^I,l}(2), \ldots, s_{t_l^I,l}(u)]^T. \quad (11)$$

TABLE 3

Subcarrier Active Index Determining Table for u = 4, v = 2

| Bits | Indexes | Sub carrier Index Subgroups |
|---|---|---|
| [0 0] | {1, 2} | $[s_l^A(1)\ s_l^A(2)\ s_l^B(1)\ s_l^B(2)]$ |
| [0 1] | {2, 3} | $[s_l^B(1)\ s_l^A(1)\ s_l^A(2)\ s_l^B(2)]$ |
| [1 0] | {3, 4} | $[s_l^B(1)\ s_l^B(2)\ s_l^A(1)\ s_l^A(2)]$ |
| [1 1] | {1, 4} | $[s_l^A(1)\ s_l^B(1)\ s_l^B(2)\ s_l^A(2)]$ |

Here, $s_{t_l^R,l}(\gamma) \in \{Re\{S^A\}, Re\{S^B\}, 0\}$, $t_l^R=1, \ldots, T$, $s_{t_l^I,l}(\gamma) \in \{Im\{S^A\}, Im\{S^B\}, 0\}$, $t_l^I=1, \ldots, T$, $\gamma=1, \ldots, u$. On the other hand, when the QSM mode is not active, which means $EN_{QM}=0$, both the in-phase and quadrature phase of $s_l$ is assigned to $t_l^R$. Then, the FIM block generator (7) makes assignment to the subcarriers of the non-selected antennas as 0 and arranges the transmission signals for the lth block as $D_l$, which is a T×u type matrix. Here, the $t_l^R$th row of $D_l$ is $s_{t_l^R,l}$ and the $t_l^I$th row is $s_{t_l^I,l}$. Then, the GFDM block generator (8) combines FIM blocks and obtains $$D = [D_1, D_2, \ldots D_L]. \quad (12)$$

Here, the dimension of the D matrix is T×N. As a result, the GFDM symbol for tth transmission antenna is shown as $$d_t = [d_{t,0,0}, \ldots, d_{t,K-1,0}, d_{t,0,1}, \ldots, d_{t,K-1,1}, \ldots, d_{t,0,M-1}, \ldots, d_{t,K-1,M-1}]. \quad (13)$$

Here, (13) is the tth row vector of the D matrix and $d_{t,k,m}$ is the data symbol of mth timeslot on kth subcarrier belonging to tth antenna. The next stage is the block interleaving stage which takes place at the block inter leaver (9). Block interleaving is used for rendering the channel without memory by segmenting the interdependent errors at the channel. For this reason, when the IM mode is active, which means when $EN_{IM}=1$, L×u dimension block interleaving is applied to $d_t$, which is the GFDM symbol for each antenna and $\tilde{d}_t$ is obtained. After the block interleaving, $\tilde{d}_t$ vector is modulated by the GFDM modulator (10) and the final GFDM transmission signal of the tth antenna is obtained as $$x_t(n) = \sum_{k=0}^{K-1} \sum_{m=0}^{M-1} \tilde{d}_{t,k,m} g_{k,m}(n). \quad (14)$$

Here, $n \in \{0, \ldots, N-1\}$ is the sampling index and $$g_{k,m}(n) = g((n-mK)_{modN}) \exp\left(j2\pi \frac{kn}{K}\right) \quad (15)$$

is a transmission filter circularly shifted to the mth timeslot and modulated to the kth subcarrier. If the filter samples are collected in a vector such as $g_{k,m} = [g_{k,m}(0), \ldots g_{k,m}(N-1)]^T$, (14) equation can be rephrased as $$x_t = A\tilde{d}_t. \quad (16)$$

Here, A matrix is a GFDM transmitter matrix in KM×KM dimensions in the following structure:

$$A = [g_{0,0}, \ldots g_{K-1,0}, g_{0,1}, \ldots g_{K-1,1}, \ldots, g_{0,M-1}, \ldots, g_{K-1,M-1}]. \quad (17)$$

Figure 2:
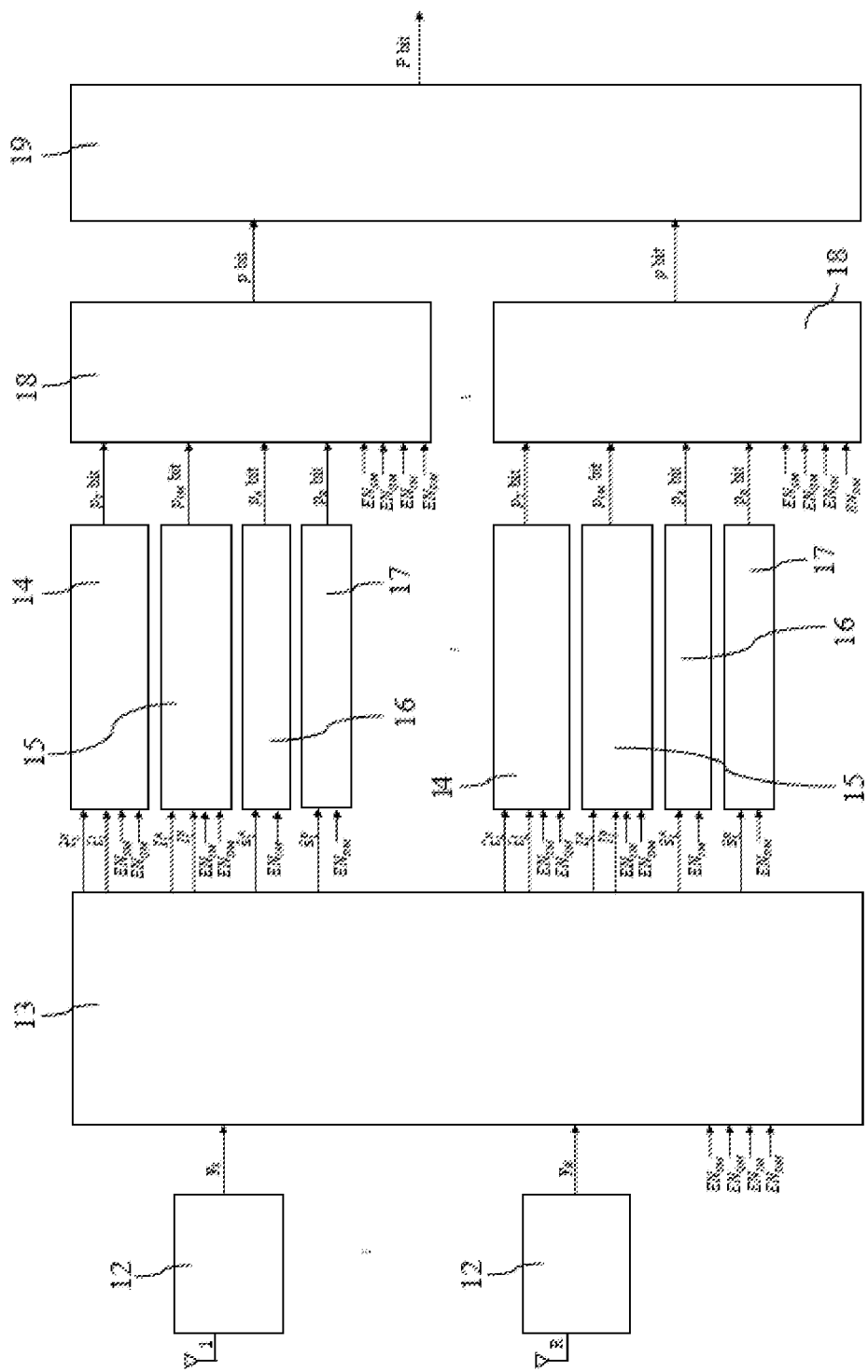
FIG. 2 shows a diagrammatic view of the receiver structure used in the method of the subject invention.

The final stage at the transmitter is the $N_{CP}$-length cyclic prefix addition (11) stage in order to convert the linear convolution effect of the channel to the cyclic convolution. After the cyclic prefix addition (11), the final GFDM symbols of $$\tilde{x}_t = [x_t(KM-N_{CP}+1:KM)^T, x_t^T]^T \quad (18)$$

are obtained. Finally, $\tilde{x}_t$ is transmitted over a frequency selective Rayleigh fading channel. The receiver block scheme used in the subject method is shown in FIG. 2. Cyclic prefix removal (12) is performed as the first stage at the receiver. Following the cyclic prefix removal (12), by accepting that the wireless transmission channel features do not change during the GFDM symbol transmission, the cyclic prefix (CP) length is longer than the channel coefficients ($N_{Ch}$) and that full synchronization is provided, the signal coming to the receiver can be shown as $$\begin{bmatrix} y_1 \\ \vdots \\ y_R \end{bmatrix} = \begin{bmatrix} H_{1,1} & \cdots & H_{1,T} \\ \vdots & \ddots & \vdots \\ H_{R,1} & \cdots & H_{R,T} \end{bmatrix} \begin{bmatrix} x_1 \\ \vdots \\ x_T \end{bmatrix} + \begin{bmatrix} w_1 \\ \vdots \\ w_R \end{bmatrix}. \quad (19)$$

Here, $y_r = [y_r(0), y_r(1), \ldots, y_r(N-1)]$ is the signal received at the rth receiver antenna, $H_{r,t}$, $t=1, \ldots, T$, $r=1, \ldots, R$ is the N×N dimension circular convolution matrix generated by the channel impulse response coefficients given by $h_{r,t} = [h_{r,t}(0), h_{r,t}(1), \ldots, h_{r,t}(N_{Ch}-1)]^T$ between the tth transmitter antenna and rth receiver antenna and $w_r$ is the additive white Gaussian noise (AWGN) vector whose NT×1 dimension elements have CN $(0, \sigma_w^2)$ distribution. Here, $h_{r,t}(n)$, has CN (0, 1) distribution. If Eq. 16 is put in place in the Eq. 19, $$\begin{bmatrix} y_1 \\ \vdots \\ y_R \end{bmatrix} = \begin{bmatrix} H_{1,1}A & \cdots & H_{1,T}A \\ \vdots & \ddots & \vdots \\ H_{R,1}A & \cdots & H_{R,T}A \end{bmatrix} \begin{bmatrix} \tilde{d}_1 \\ \vdots \\ \tilde{d}_T \end{bmatrix} + \begin{bmatrix} w_1 \\ \vdots \\ w_R \end{bmatrix} \quad (20)$$

is obtained. Eq. 20 can simply be shown as $$y = \tilde{H}\tilde{d} + w. \quad (21)$$

Here, dimensions of y, $\tilde{H}$, $\tilde{d}$ and w are NR×1, NR×NT, NT×1 and NR×1, respectively.

The most critical part of the receiver is the part where the MIMO signal detection, GFDM and space-frequency index demodulation (13) procedures are realized.

The optimum decision rule for the proposed method is to select the ones which have the greatest likelihood from the antenna index, subcarrier index and QAM signals used in the transmission by observing the received signal and channel coefficients. In the MIMO-OFDM application, the orthogonality between the subcarriers enables for applying the optimum decision rule independently for each subcarrier. In GFDM, the interference between the subcarriers prevents the independent operation of the optimum decision rule for each subcarrier, therefore, in MIMO-GFDM application, the optimum decision rule is needed to be operated by considering all the subcarriers. However, in this case, a processing complexity which cannot be handled takes place. The ML-SIC (Maximum Likelihood-Successive Interference Cancellation) detection technique proposed as a part of the proposed method reduces this complexity and enables for operating a near-optimal decision rule which jointly decides the antenna index, subcarrier index and QAM signals used in the transmission and which processes all the subcarriers together.

Figure 3:
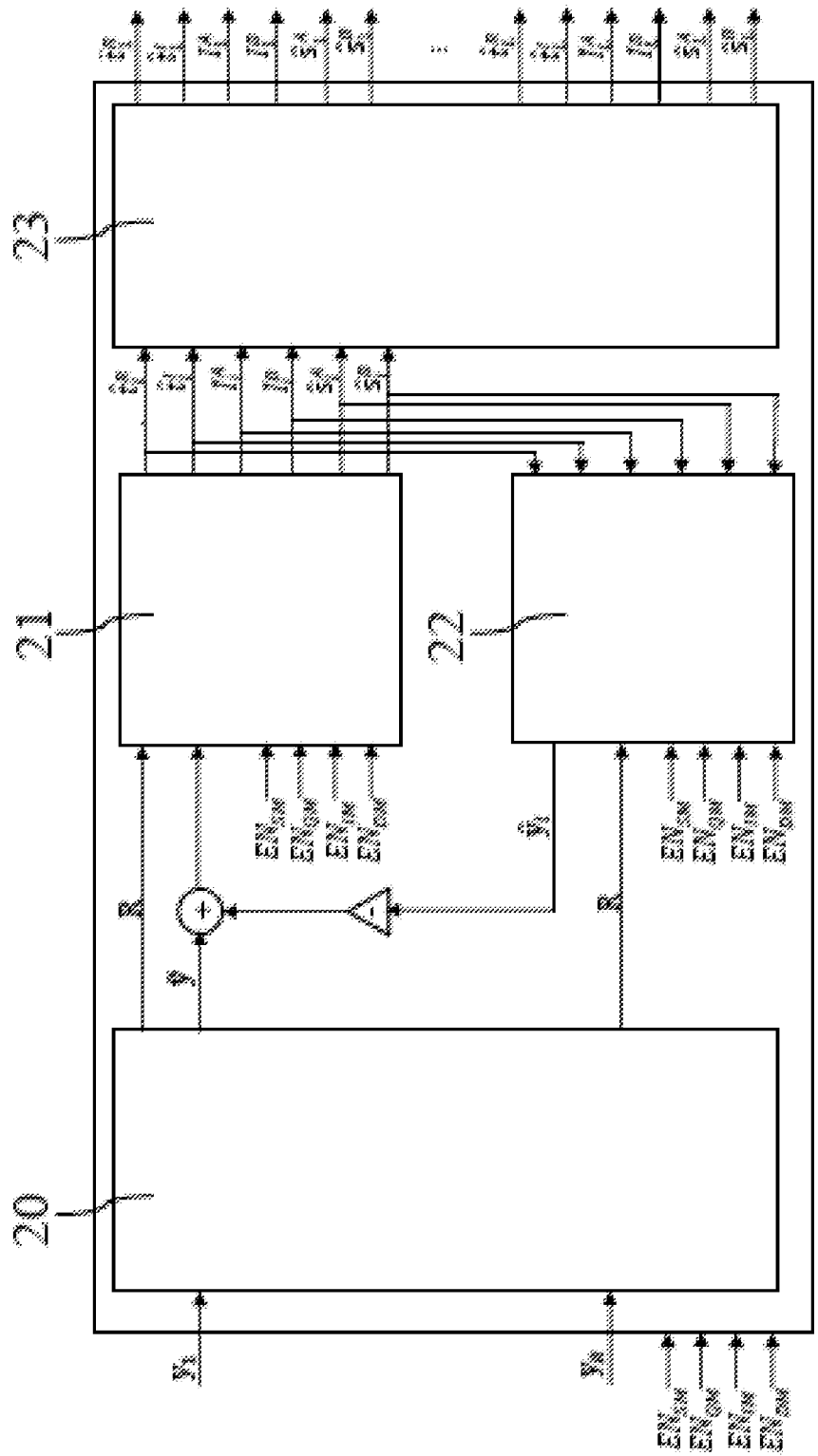
FIG. 3 shows a view of the block diagram of ML-SIC MIMO Detection, GFDM and Space-Frequency Index Demodulation used in the method of the subject invention.
Figures 4A, 4B:
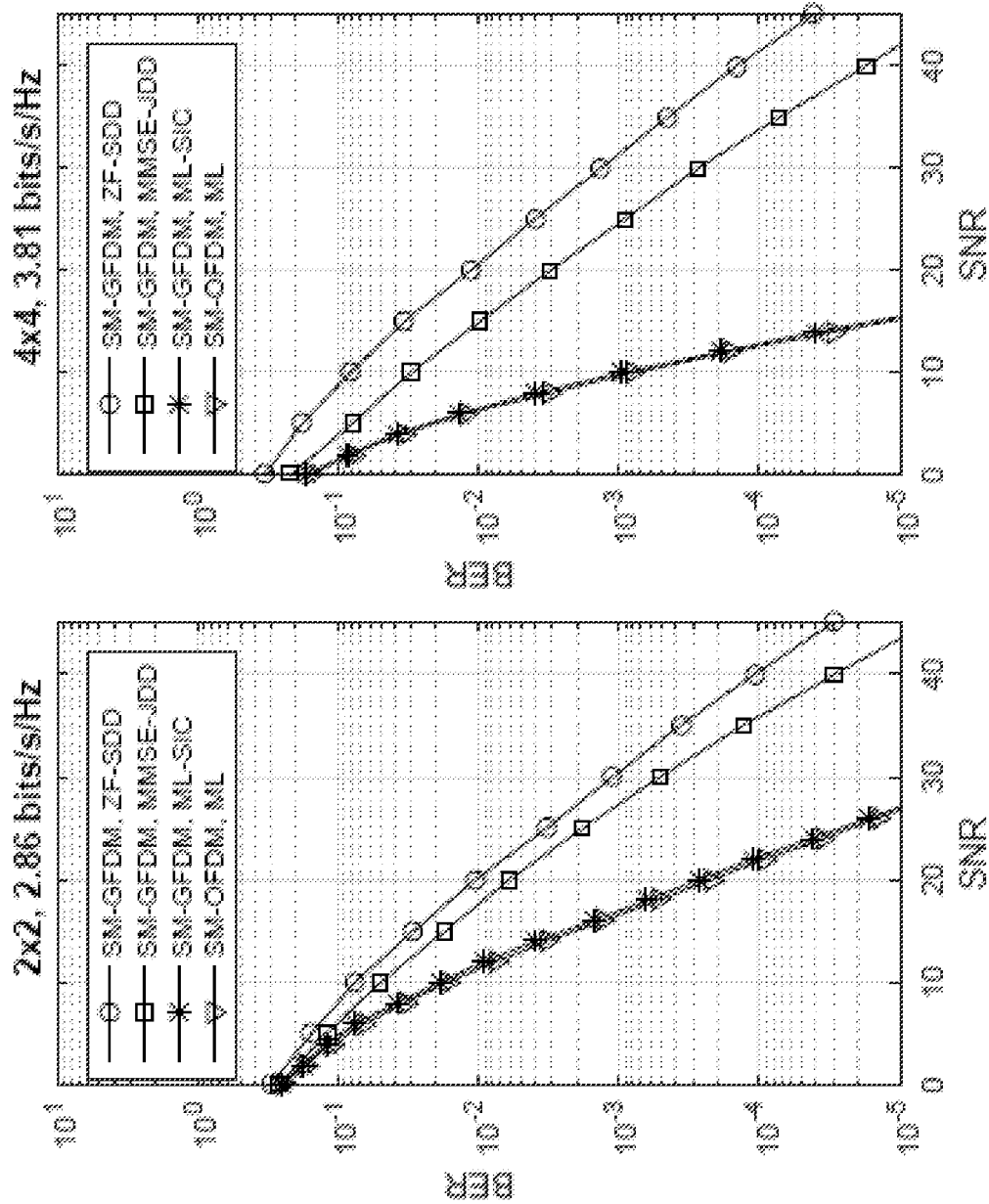
FIG. 4a shows a view of the uncoded bit error rate performance of the ZF-SDD, MMSE-JDD, ML-SIC and methods for 2×2, SM, using 4-QAM.
FIG. 4b shows a view of the uncoded bit error rate performance of the ZF-SDD, MMSE-JDD, ML-SIC and methods for 4×4 SM, using 4-QAM.
Figures 5A, 5B:
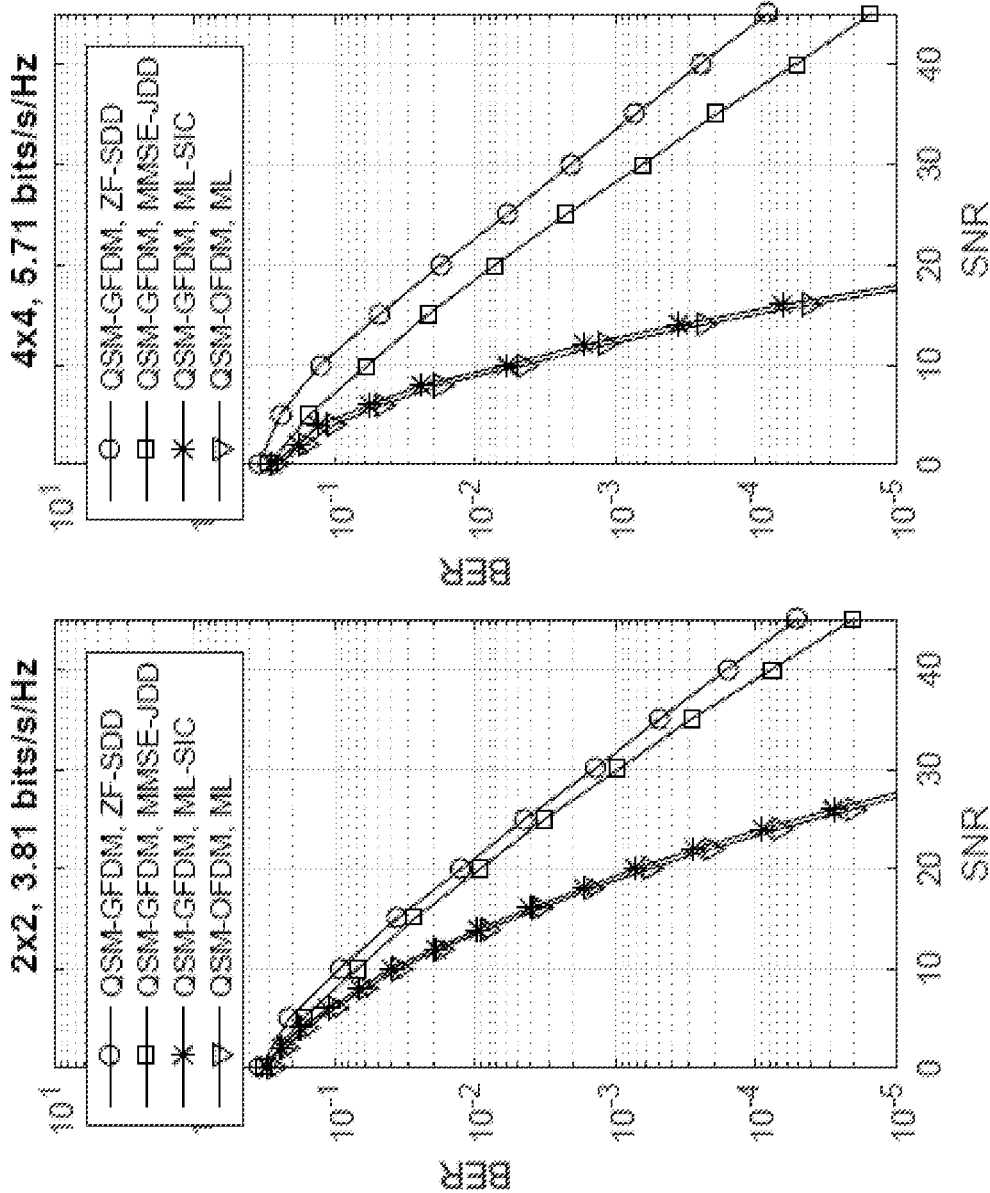
FIG. 5a shows a view of the uncoded bit error rate performance of the ZF-SDD, MMSE-JDD, ML-SIC and ML methods for 2×2, QSM, using 4-QAM.
FIG. 5b shows a view of the uncoded bit error rate performance of the ZF-SDD, MMSE-JDD, ML-SIC and ML methods for 4×4 QSM, using 4-QAM.
Figures 6A, 6B:
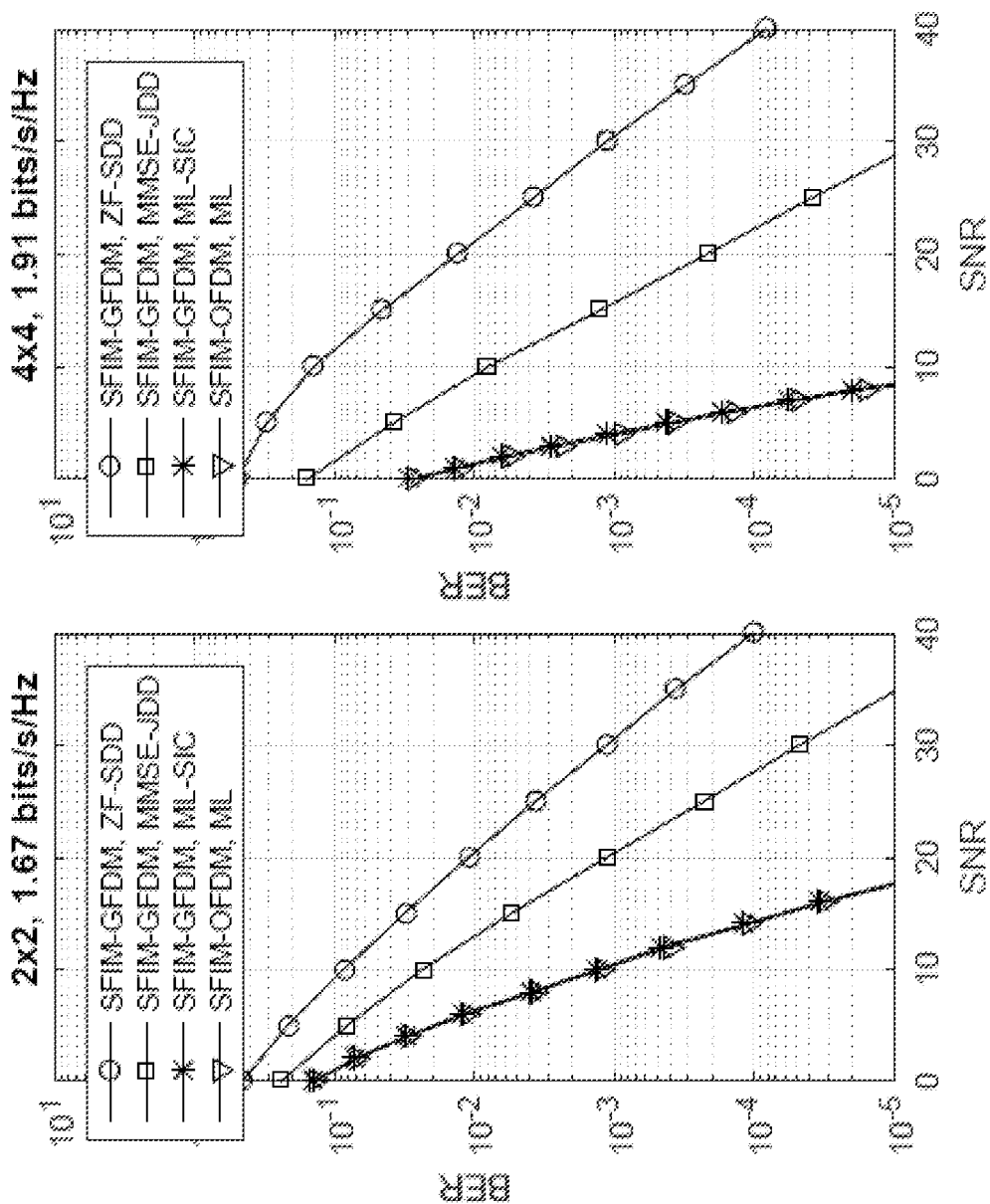
FIG. 6a shows a view of the uncoded bit error rate performance of the ZF-SDD, MMSE-JDD, ML-SIC and ML methods for 2×2, SFIM, using 4-QAM.
FIG. 6b shows a view of the uncoded bit error rate performance of the ZF-SDD, MMSE-JDD, ML-SIC and ML methods for, 4×4 SFIM, using 4-QAM.
Figure 7B:
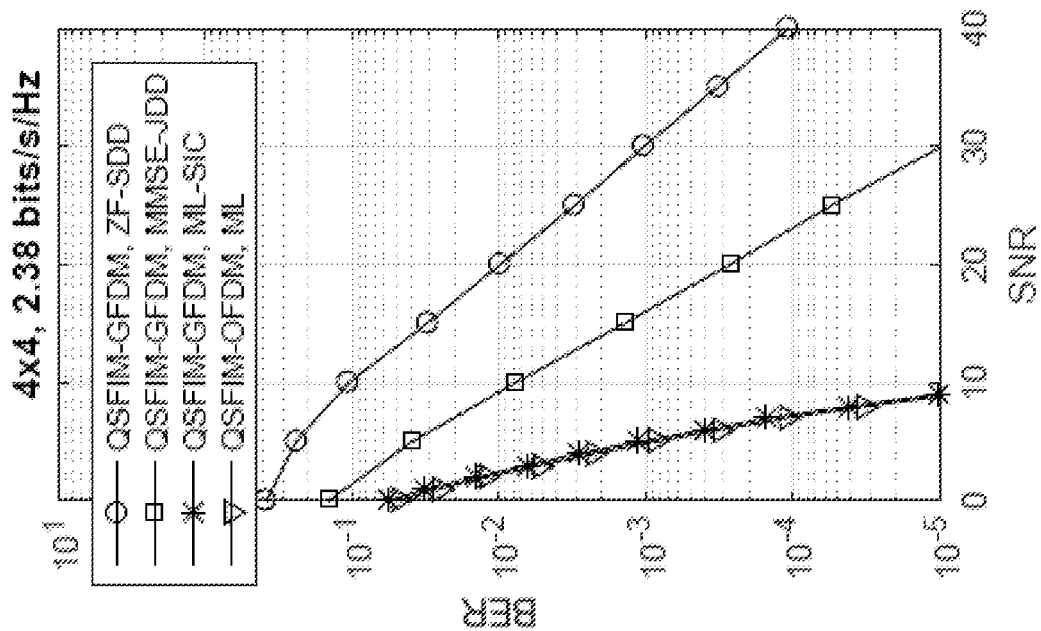
FIG. 7b shows a view of the uncoded bit error rate performance of the ZF-SDD, MMSE-JDD, ML-SIC and ML methods for, 4×4 QSFIM, using 4-QAM.
Figure 7A:
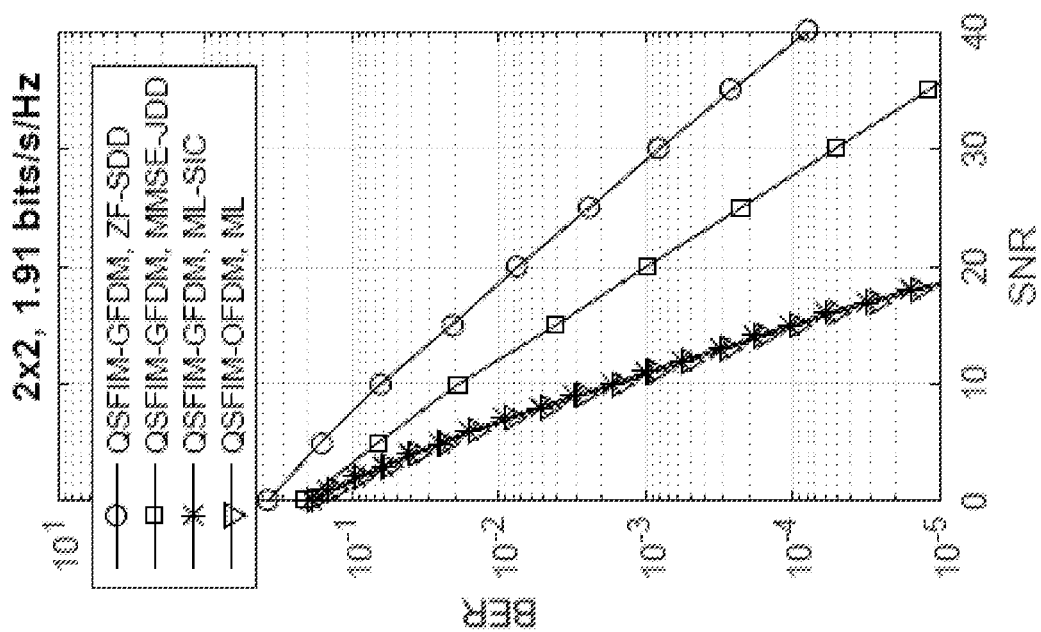
FIG. 7a shows a view of the uncoded bit error rate performance of the ZF-SDD, MMSE-JDD, ML-SIC and ML methods for 2×2, QSFIM, using 4-QAM.
Figures 8A, 8B:
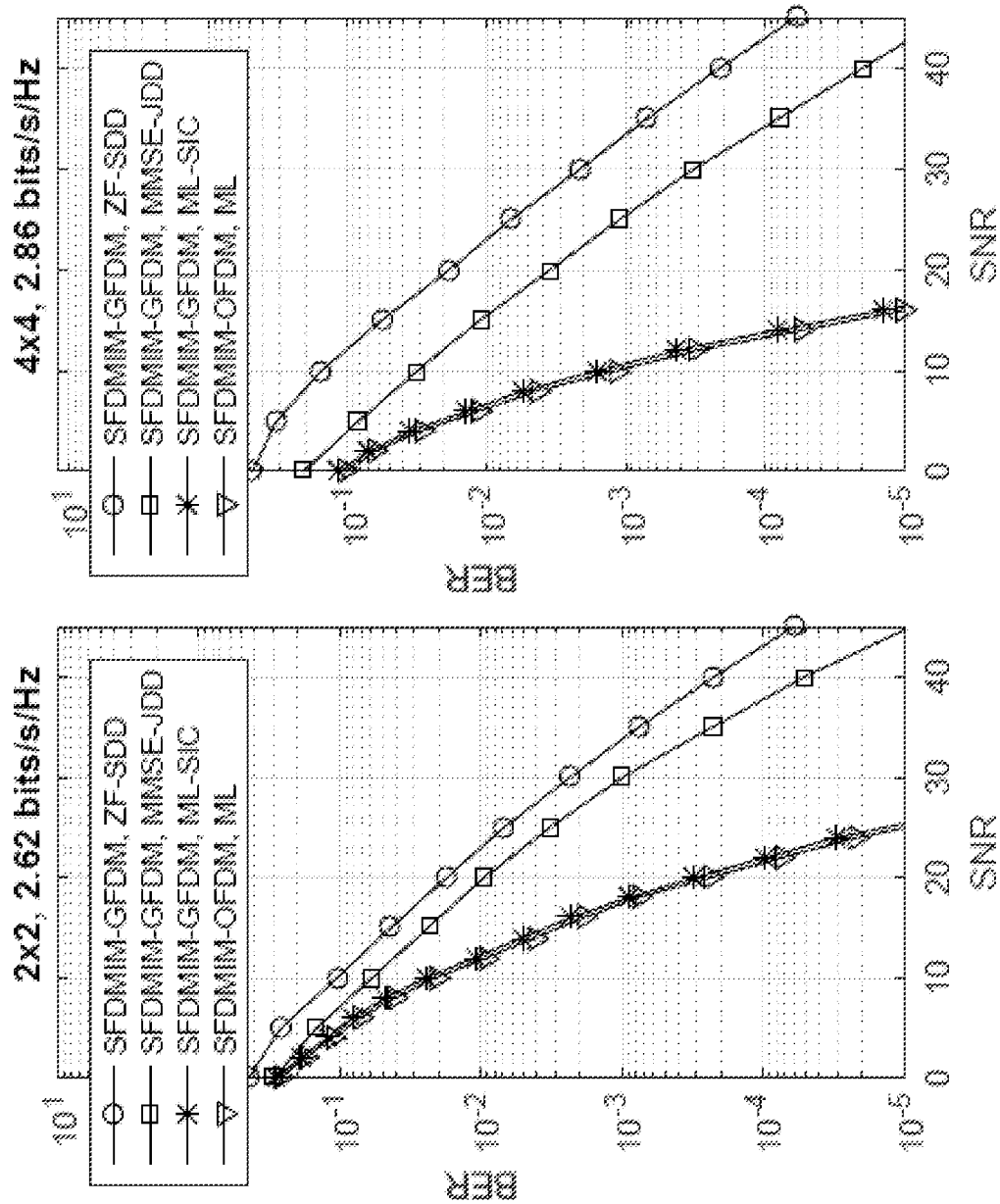
FIG. 8a shows a view of the uncoded bit error rate performance of the ZF-SDD, MMSE-JDD, ML-SIC and ML methods for 2×2, SFDMIM, using 4-QAM.
FIG. 8b shows a view of the uncoded bit error rate performance of the ZF-SDD, MMSE-JDD, ML-SIC and ML methods for 4×4 SFDMIM, using 4-QAM.
Figures 9A, 9B:
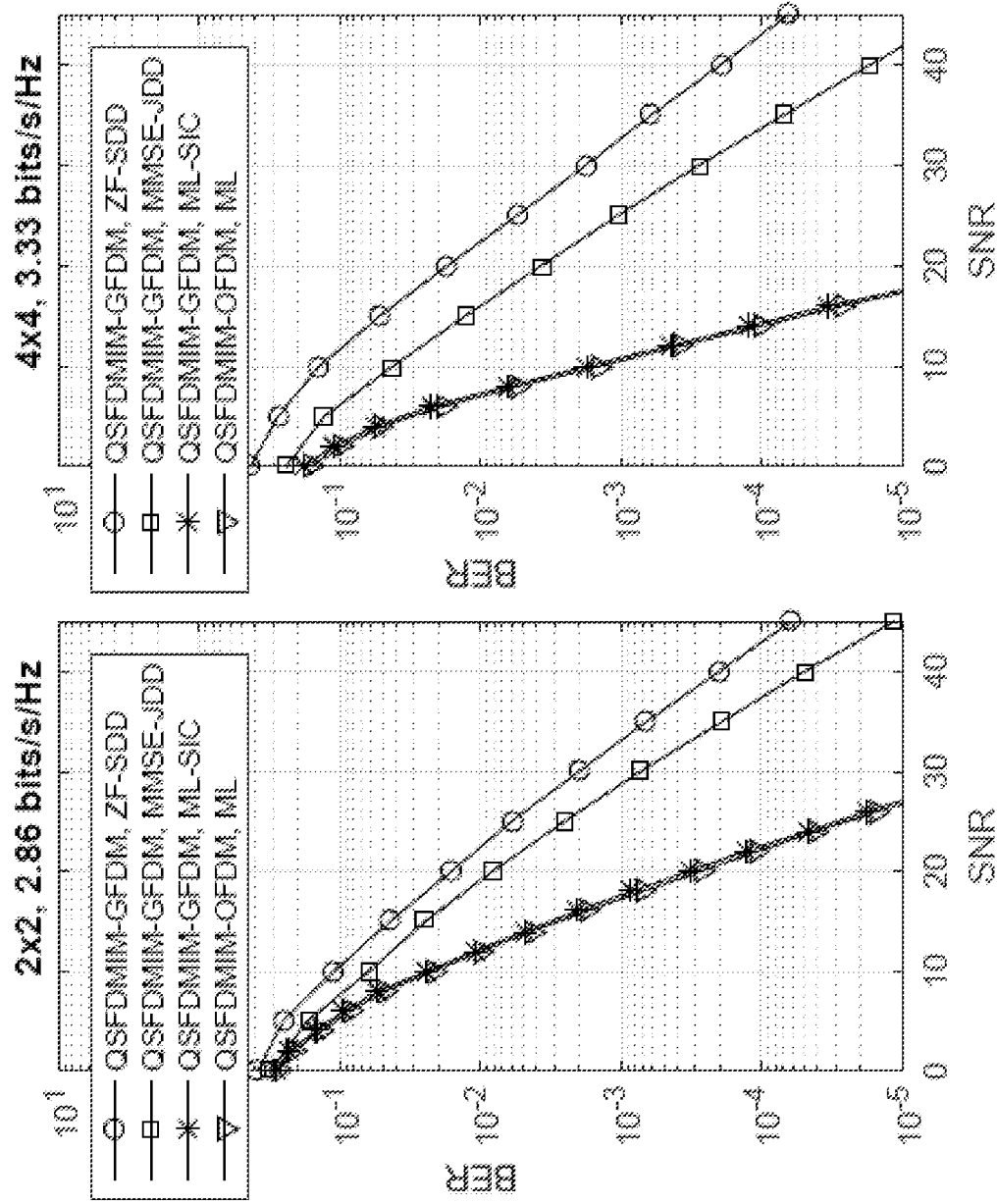
FIG. 9a shows a view of the uncoded bit error rate performance of the ZF-SDD, MMSE-JDD, ML-SIC and ML methods for 2×2, QSFDMIM, using 4-QAM.
FIG. 9b shows a view of the uncoded bit error rate performance of the ZF-SDD, MMSE-JDD, ML-SIC and ML methods for 4×4 QSFDMIM, using 4-QAM.

The block scheme of the proposed ML-SIC detection method is in FIG. 3. QR decomposition of the channel matrix $\tilde{H}$ is $$\tilde{H} = QRP^T, \quad (22)$$

where Q matrix is an NR×NT dimension unitary matrix, R matrix is a NT×NT dimension upper triangular matrix, P matrix is a permutation matrix which enables arranging the rows of the $\tilde{H}$ matrix before analysis in order to provide for deciding the transmitted signals based on the "space-frequency index modulation block" (UFIMB). If block interleaving is applied at the transmitter, before arranging the H matrix rows based on UFIMB, block deinterleaving should be applied. The process presented in the block scheme is described below.

QR decomposer (20) combines the signals received from the antennas first and obtains the $y = [y_1^T, y_2^T, \ldots, y_R^T]^T$ vector. Then obtains the $$\tilde{y} = Q^H y = R\tilde{d} + \tilde{w} \quad (23)$$

vector which is the received signal vector altered by applying multiplication from left with $Q^H$.

Here, $\tilde{w} = Q^H w$, $\tilde{d}$ is the arranged form of the transmission vector d based on UFIMB:

$$\tilde{d} = P^T d = [z_1^T, z_2^T, \ldots, z_L^T]^T. \quad (24)$$

Here, $z_l$ the space-frequency index modulation block is (UFIMB):

$$z_l = [s_{1,l}, s_{2,l}, \ldots, s_{T,l}]. \quad (25)$$

In the Eq. 25, $s_{t,l}$ (t=1, ..., T and l∈{1, ..., L}) is a u×1 dimension vector:

$$s_{t,l} = [s_{t,l}[1], s_{t,l}[2], \ldots, s_{t,l}[u]] = [d_t((l-1)u+1:lu), \quad (26)$$

which means UFIMB is a vector which is formed by lining the index modulation samples of each antenna under one another. Since the index modulation group has u number of elements, in UFIMB, u*T numbers of samples are present. As indicated before, when the IM mode is disabled, u=1, $s_{t,l}$ includes only one element.

In the next step, the detection procedure is started by making use of the upper triangle feature of the R matrix on the Eq. 23. First, space-frequency block (UFIM) ML (maximum likelihood) detector (21) finds the most likely solution for the last UFIMB, UFIM block recreator (22) uses this solution and obtains the transmit signal of the related UFIMB. Then, this signal is extracted from the signal coming to the receiver and the interference caused by UFIMB is eliminated. After that, system reduces its dimension by uT times and skips to the UFIMB second to the last. This procedure is applied for all UFIMBs. During the procedure, the outputs of each UFIMB are stored by the UFIM block dispatcher (23).

The ML-SIC detection algorithm of the proposed method is given in Algorithm-1.

In this algorithm, uT shows the last uT part, $\overline{uT}$ shows the part outside the last uT part and: shows all the elements of the indexed object. When running the algorithm is completed, for each UFIMB, the transmitter antennas, subcarrier index sub-groups and transmission constellation signals corresponding to the in-phase and quadrature phase transmission signals for each UFIMB are respectively detected as $\hat{t}_l^R, \hat{t}_l^I, \hat{I}_l^A, \hat{s}_l^A, \hat{s}_l^B$.

After the MIMO signal detection, GFDM and space-frequency index demodulation (13) are complete, information bits corresponding to $\hat{t}_l^R, \hat{t}_l^I, \hat{I}_l^A, \hat{s}_l^A, \hat{s}_l^B$ are obtained by the demapping procedure. First, $\hat{t}_l^R$ and $\hat{t}_l^I$ estimation values are converted to $p_T$ number of bits by the Tx Ant. demapper (14). The $\hat{I}_l^A$ estimation value is converted to $p_{IM}$ number of bits by index demapper (15). The v number of QAM symbols in the $\hat{s}_l^A$ vector is converted to $p_A$ number of bits by the Q-ary demapper A (16). The u–v number of QAM symbols in the $\hat{s}_l^B$ vector is converted to $p_B$ number of bits by the Q-ary demapper B (17). Then, the secondary bit combiner (18) obtains the p-bit array for each space-frequency index modulation block. The last stage is obtaining P bit input information bits by combining p-bit arrays with the primary bit combiner (19).

---

Algorithm 1: ML-SIC detection

| | |
|---|---|
| 8. | Input = $\tilde{y}$, R |
| 9. | Output = $\hat{t}_l^R, \hat{t}_l^I, \hat{I}_l^A, \hat{I}_l^B, \hat{s}_l^A, \hat{s}_l^B$ for l = 1, ..., L |
| 10. | For l←L to 1 do |
| 11. | $\hat{z}_l = \underset{t, l^A, S^A, s^B}{\operatorname{argmin}} \|\tilde{y}_{uT} - R_{uT,uT} z_l\|^2$ |
| 12. | $\hat{y}_l = R_{:,uT}\hat{z}_l, \tilde{y} \leftarrow \tilde{y} - \hat{y}_l$ |
| 13. | $\tilde{y} \leftarrow \tilde{y}_{\overline{uT}}, R \leftarrow R_{\overline{uT},\overline{uT}}$ |
| 14. | end for |

---

Computer Simulation Results:

The bit error rate (BER) performance of the proposed method belong to the invention is obtained through Monte Carlo simulations. The algorithm of the proposed method for computer simulations which realizes the technical features described above in detail is written and the bit error rate calculation has been realized in computer environment. In the simulations, Extended Pedestrian Model-A, (EPA-A) channel model prepared for the Rayleigh channel is used.

The error performance of the MIMO-GFDM-FIM method proposed by the computer simulations realized, have been compared with the OFDM system having the ML receiver structure and the GFDM systems having the ZF-SDD and MMSE-JDD receiver structures present in the literature. In the simulations, binary phase shift keying (BPSK), 4-ary quadrature amplitude modulation (4-QAM), 8-ary quadrature amplitude modulation (8-QAM) and 16-ary quadrature amplitude modulation (16-QAM) in the present standards have been used. The T transmitter and R receiver antenna (T×R) MIMO systems considered are 2×2 and 4×4 (two-each and four-each transmitter/receiver antenna systems). The coded channels and uncoded channels in the method of the invention have been dealt with separately. Simulation parameters shown in Table 4.

TABLE 4

Other parameters used in the simulations

| Description | Parameter | Value |
|---|---|---|
| GFDM subcarrier number | K | 128 |
| GFDM sub-symbol number | M | 5 |
| Pulse Shaping Filter | g | Raised Cosine (RC) |
| Cyclic prefix length | $N_{CP}$ | 32 |
| Roll-Off factor | a | 0.1 |

In FIG. 4-9, the uncoded BER performances for SM, QSM, SFIM, QSFIM, SFDMIM and QSFDMIM MIMO-GFDM structures of the subject method respectively by using 4-QAM in the 2×2 and 4×4 transmitter-receiver antenna configurations are given. The dimensions of the MIMO system used and the spectral efficiency values have been indicated in the related figures. With the purpose of comparison, BER performances of the same MIMO-OFDM applications for the same modulation and transmitter/receiver antenna numbers are shown in the figures. The receiver structure proposed in the method of the invention ML-SIC and the signal to noise ratio (SNR) gains provided for $10^{-4}$ BER value (in decibel, dB) is given in Table 5.

As can be seen from this table and figures, the ML-SIC method proposed in all scenarios considered reduces the SNR value (transmitter transmission power) which is necessary in order to reach a target BER value according to the receiver structures in the literature. The considerable BER gains obtained by the proposed ML-SIC method results from deciding the antenna index, active subcarrier index and QAM symbols jointly with a near optimum decision rule and the high diversity value of the ML-SIC method. In addition, almost the same BER performance can be obtained with the same MIMO-OFDM configuration. By this means, thanks to the lower out-of-band emission and reduced cyclic prefix compared to MIMO-OFDM, a higher spectral efficiency is obtained. For the reference values in Table-4, the spectral efficiency increases obtained thanks to the cyclic prefix reduced in comparison to OFDM with GFDM is 19%.

In order for the method proposed and the other methods to be realized at the receiver, the complex multiplication numbers are given in Table-6. According to Table-6, while the ML and ZF-SDD receiver structure have the highest and lowest complexity, respectively, ML-SIC and MMSE-JDD methods are intermediate solutions in terms of complexity. From these results, it is seen that the ML-SIC method provides a trade-off between complexity and BER performance.

TABLE 5

Signal to noise ratio (SNR) gains the method of the subject invention enables a $10^{-4}$ bit error rate (BER) value compared to the other methods (in decibel (dB))

| Structure/Method | Gain Obtained Against ZF-SDD Method | Gain Obtained Against MMSE-JDD Method |
|---|---|---|
| 2 × 2 SM | 18.1 | 13.7 |
| 4 × 4 SM | 28.7 | 21 |
| 2 × 2 QSM | 18.2 | 13.8 |
| 4 × 4 QSM | 28.8 | 21.2 |
| 2 × 2 SFIM | 25.7 | 13.4 |
| 4 × 4 SFIM | 32.8 | 15.8 |
| 2 × 2 QSFIM | 25.8 | 13.5 |
| 4 × 4 QSFIM | 32.9 | 15.9 |
| 2 × 2 SFDMIM | 21.2 | 15.9 |
| 4 × 4 SFDMIM | 29.2 | 20.4 |
| 2 × 2 QSFDMIM | 21.3 | 16.0 |
| 4 × 4 QSFDMIM | 29.3 | 20.5 |

TABLE 6

Complex multiplication numbers necessary for realizing the methods at the receiver

| Structure/Method | ZF-SDD | MMSE-JDD | ML-SIC | ML |
|---|---|---|---|---|
| 2 × 2 SM | $2.49 \times 10^6$ | $6.31 \times 10^9$ | $4.21 \times 10^9$ | $1 \times 10^{581}$ |
| 4 × 4 SM | $5.09 \times 10^6$ | $5.04 \times 10^{10}$ | $3.36 \times 10^{10}$ | $1 \times 10^{783}$ |
| 2 × 2 QSM | $2.5 \times 10^6$ | $6.31 \times 10^9$ | $4.21 \times 10^9$ | $1 \times 10^{783}$ |
| 4 × 4 QSM | $5.21 \times 10^6$ | $5.04 \times 10^{10}$ | $3.36 \times 10^{10}$ | $1 \times 10^{1157}$ |
| 2 × 2 SFIM | $2.64 \times 10^6$ | $6.30 \times 10^9$ | $4.21 \times 10^9$ | $1 \times 10^{341}$ |
| 4 × 4 SFIM | $5.7 \times 10^6$ | $5.04 \times 10^{10}$ | $3.36 \times 10^{10}$ | $1 \times 10^{389}$ |
| 2 × 2 QSFIM | $2.8 \times 10^6$ | $6.31 \times 10^9$ | $4.21 \times 10^9$ | $1 \times 10^{389}$ |
| 4 × 4 QSFIM | $7.67 \times 10^6$ | $5.04 \times 10^{10}$ | $3.36 \times 10^{10}$ | $1 \times 10^{485}$ |
| 2 × 2 SFDMIM | $5.1 \times 10^6$ | $6.31 \times 10^9$ | $4.22 \times 10^9$ | $1 \times 10^{533}$ |
| 4 × 4 SFDMIM | $1.55 \times 10^7$ | $5.04 \times 10^{10}$ | $3.37 \times 10^{10}$ | $1 \times 10^{581}$ |
| 2 × 2 QSFDMIM | $7.72 \times 10^6$ | $6.31 \times 10^9$ | $4.23 \times 10^9$ | $1 \times 10^{581}$ |
| 4 × 4 QSFDMIM | $4.7 \times 10^7$ | $5.04 \times 10^{10}$ | $3.38 \times 10^{10}$ | $1 \times 10^{677}$ |

Figure 10:
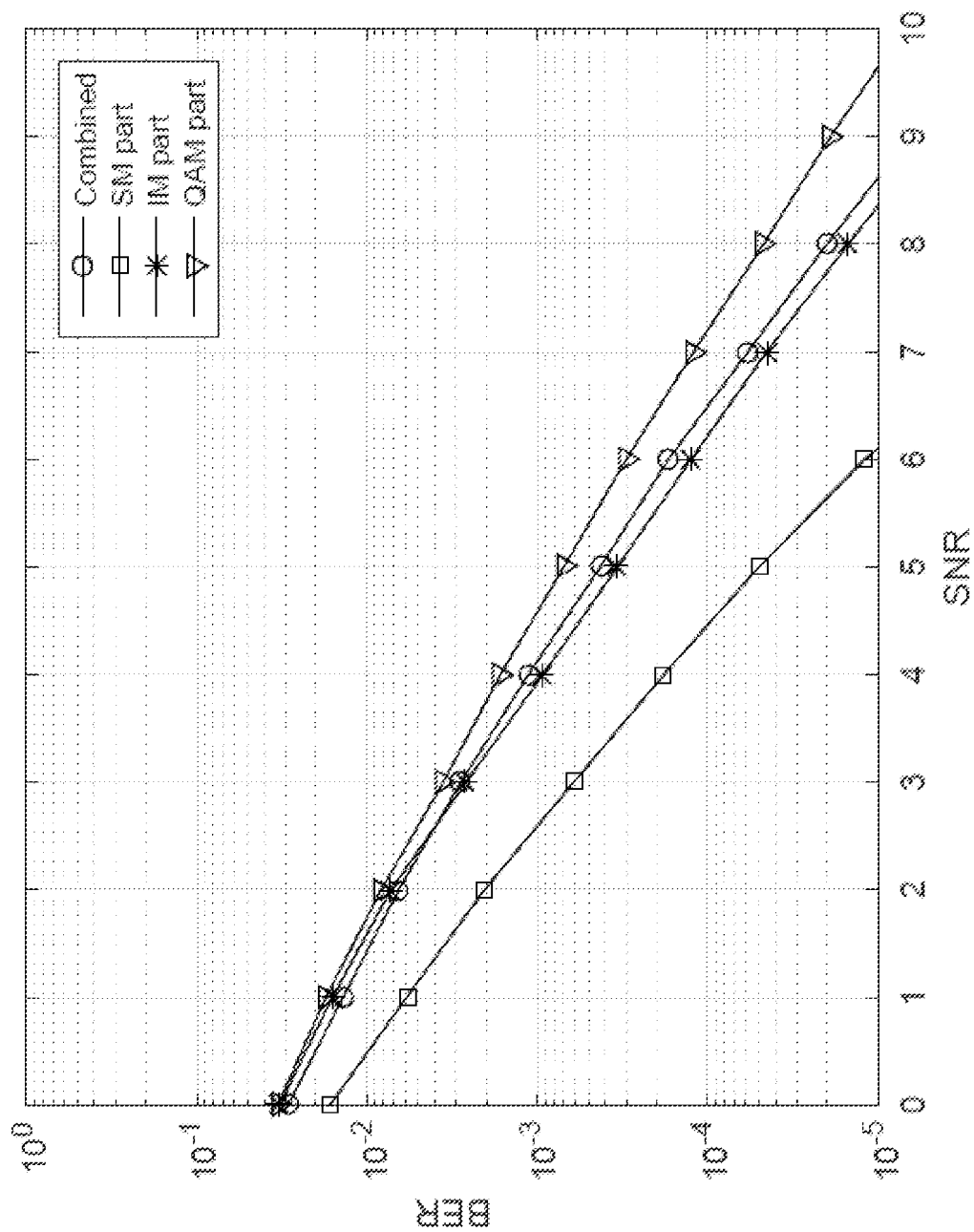
FIG. 10 shows a view of the uncoded bit error rate performance of the ML-SIC method in 4×4 MIMO configurations of the SM, IM and QAM modulation parts of the SFIM-GFDM receiver, using 4-QAM.

In the method of the subject invention, the SM, IM and QAM modulations can be positioned as three distinct layers. As can be seen in FIG. 10, the SM part consumes 2 dB less power according to the total bit error performance and enables to reach $1 \times 10^{-4}$ bit error rate. By this means, with the proper conditioning of the primary bit splitter (1) and secondary bit splitter (2) blocks at the transmitter, the bits which need to be transmitted with high safety are directed at the antenna indexes and an additional gain can be provided.

Figure 11:
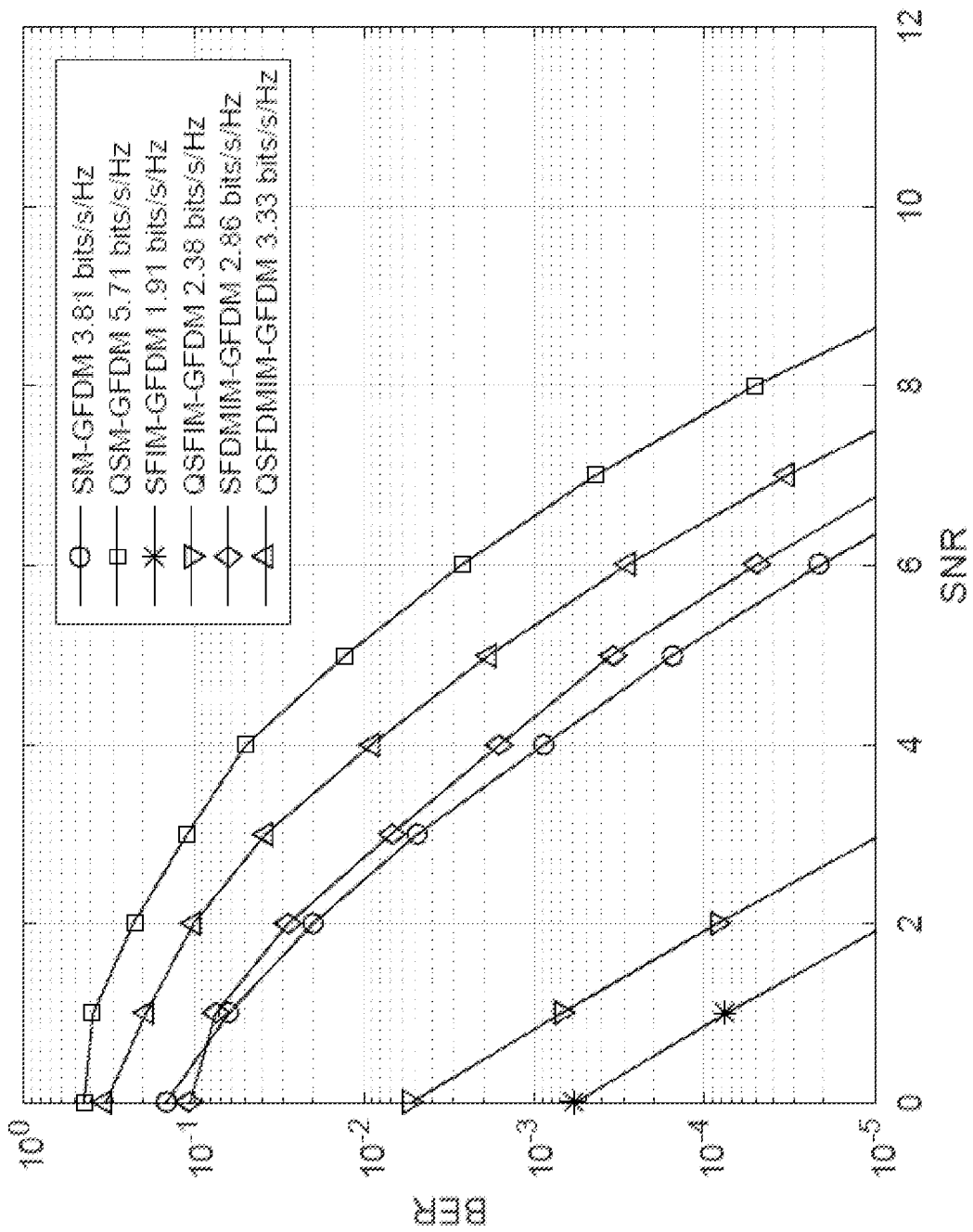
FIG. 11 shows a view of the uncoded bit error rate performance of the ML-SIC method in 4×4 MIMO configuration of the MIMO-GFDM-FIM system using 4-QAM, for convolutional channel coded different spectral efficiencies.

In FIG. 11, a convolutional channel coded bit error rate performance of the method of the invention in 4×4 MIMO configurations for ML-SIC method using 4-QAM is seen. The generator sequence of the channel coding is [133, 171, 165]. As can be seen from FIG. 11, when channel coding is applied, a BER gain between 5.4 and 8.1 dB based on the uncoded condition is obtained.

Figure 12:
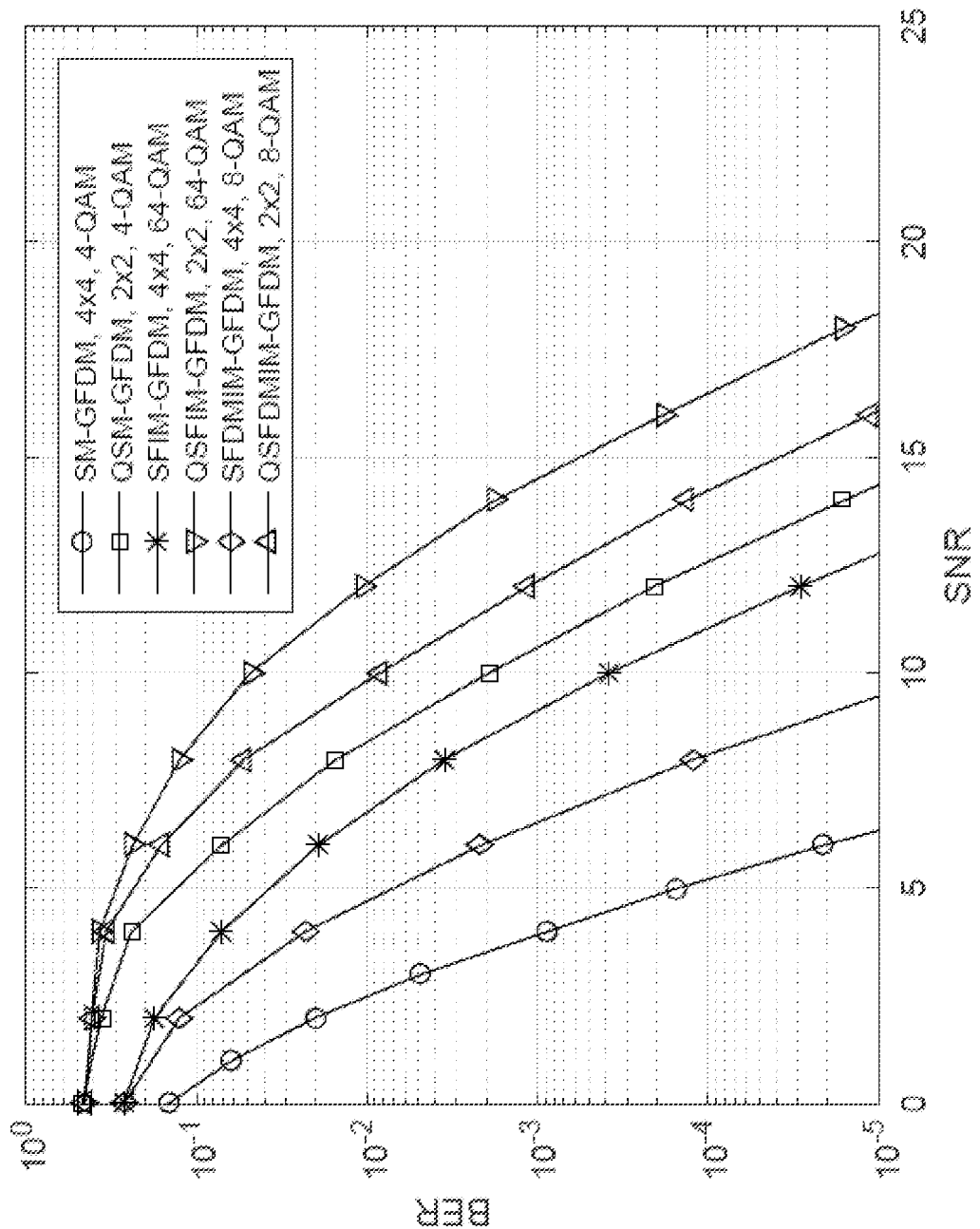
FIG. 12 shows a view of the uncoded bit error rate performance of the ML-SIC method in MIMO configuration of the MIMO-GFDM-FIM system using 4-QAM, for convolutional channel coded 3.81 bit/s/Hz spectral efficiency.

In FIG. 12, the coded BER performance of the subject method is observed for 3.81 bit/s/Hz spectral efficiency. As can be seen from FIG. 12, BER performance in the subject method is better at 4×4 configurations as independent from the modulation level. From this point of view, it can be said that in the ML-SIC method BER performance, the receiver antenna number is the main determinant.

From these results, it can be seen that the SM, QM, IM, DMIM modes are applicable to the GFDM system. The proposed ML-SIC method provides a significant BER gain compared to the present methods in the literature. This gain results from the near optimal detection structure of the ML-SIC method.

In the method of the subject invention, by means of the pulse shaping applied in GFDM, the out-of-band emission is lower compared to OFDM. In OFDM, rectangular pulse is used as the pulse form in the time domain. The equivalent of the rectangular pulse in the frequency domain is in the "sinc" signal form. For this reason, the out-of-band emission in OFDM is disturbingly high and a space should be left between neighboring systems at the frequency spectrum. This causes the inefficient use of the frequency spectrum. In GFDM, pulse shaping which has a low out-of-band emission such as Raised Cosine (RC) or Root Raised Cosine (RRC) is used. By this means, the need to leave a space between neighboring systems is eliminated.

In the method of the subject invention, since one cyclic prefix is used for more than one timeslot in GFDM, spectral efficiency is higher compared to the OFDM method which uses equivalent time-frequency resources. In OFDM, only one timeslot is used on a subcarrier and CP is added to this timeslot. In GFDM, one CP is added per block composed of more than one timeslot. By this means, the spectral efficiency increases in GFDM based systems.

The method of the subject invention is a multicarrier method making use of the spatial modulation. In the multicarrier applications of the spatial modulation, for each subcarrier, only one antenna is activated.

In the method of the subject invention, both spatial modulation and the subcarrier index modulation can be applied together according to the system configuration. Activating a single antenna per subcarrier the subcarrier group prevents inter-antenna interference and the receiver complexity is reduced by this means.

The method of the subject invention is a multi-layered method which brings the GFDM, spatial modulation, subcarrier index modulation and QAM/PSK modulations together. In this type of multi-layered applications, while deciding the symbol sent in order to obtain high error performance at the receiver, a common decision rule needs to be used which considers all the layers. In this case, the optimum receiver structure is used. The optimum receiver, antenna index, subcarrier index and QAM/PSK symbol for the proposed method should be decided under a common decision rule.

Because of the pulse shaping applied at GFDM, the orthogonality between subcarriers is lost. For this reason, the optimum decision rule cannot be operated subcarrier-base, all the subcarriers should be considered. This brings a considerably high process complexity. With the maximum likelihood-successive interference cancellation (ML-SIC) detection method as a part of this invention, the antenna index, subcarrier index and QAM/PSK symbol can be decided by a common decision rule without increasing complexity. Therefore, the bit error rate value targeted by the proposed method can be reached by a lower signal to noise ratio (lower transmitter transmission power).

In the method of the subject invention, on the contrary of the classical method, the number of the active subcarriers of the multicarrier system can be changed and thus, a trade-off between spectral efficiency and performance is presented by providing a dynamic communication.

The method of the subject invention combines the spatial modulation and subcarrier index modulation in a configurative manner and enables the channel to adapt onto the proper structure without the transmitter and receiver structure being changed when the channel conditions change. Therefore, the trade-off between band efficiency and performance can be used in an adaptive way according to factors such as the channel conditions, application requirements, etc.

The method of the subject invention combines the spatial modulation and subcarrier index modulation and QAM/PSK modulations. These modulations have different error performances in their own right.

The most important advantage of the invention is that it provides to have energy efficiency provided by the space and frequency index modulation systems with GFDM without complicating the transmitter and receiver structure.

What is claimed is:

1. A generalized frequency division multiplexing method with multiple-input multiple-output and flexible index modulation, the method comprising the steps of:
    taking a generalized frequency division multiplexing (MIMO-GFDM) system with multiple-input multiple-output composed of T number of transmitters and R numbers of receiver antennas;
    then separating P number data bits to p-bit L groups each by a primary bit splitter;
    mapping p-bit in each group with a u-element subcarrier group;
    taking the $p_T = EN_{SM}(1+EN_{QM})\log_2(T)$ bit part of p bits of data in the Tx Antenna selector block, wherein $EN_{SM}$ is a control signal used to control a spatial modulation (SM) mode in an on-off fashion, $EN_{QM}$ is a control signal used to control a quadrature spatial modulation (QM) mode in the on-off fashion, and $EN_{SM}$ and $EN_{QM}$ are equal to 0 or 1;
    defining the p bits as a binary number;
    determining a transmission antenna for the u-element subcarrier group at a transmitter antenna numbered by a decimal number corresponding to the binary number;
    the subcarrier index selector block taking $p_{IM}$ bits and choosing the $p_{IM}$ bits as subcarrier indexes indicated by $I_l^A = \{i_{l,1}^A, i_{l,2}^A, \ldots, i_{l,v}^A\}$ in a primary subcarrier group according to a selection rule, wherein the $p_{IM}$ bits are index modulation (IM) bits, and A refers to a primary IM subgroup;
    then choosing remaining bits of p-bit data and QAM symbols to be assigned to the subcarriers;
    generating a generalized frequency division multiplexing (GFDM) symbol by bringing u-element L number of groups together;
    then, making a $N_{CP}$-length cyclic prefix addition in order to convert a linear convolutional effect of the channel to a cyclic convolution;
    performing a cyclic prefix removal at the receiver;
    operating a near optimum decision rule with a maximum likelihood-successive interference cancellation (ML-SIC) technique in order to determine data transmitted at the receiver with maximum precision;
    then, obtaining a p-bit array for each space-frequency index modulation block at a secondary bit combiner;
    finally, obtaining the P bit input information bits by combining the p bit arrays with a primary bit combiner.

2. The method according to claim 1, wherein, a single antenna is configured to broadcast at a same time at one frequency channel.

3. The method according to claim 1, further comprising: realizing, a transition between different space-frequency index modulations by means of mode control signals.

* * * * *